(12) United States Patent
Colgan et al.

(10) Patent No.: US 12,073,475 B2
(45) Date of Patent: Aug. 27, 2024

(54) UPWARD FACING LIGHT SENSOR FOR PLANT DETECTION

(71) Applicant: Blue River Technology Inc., Santa Clara, CA (US)

(72) Inventors: Matthew Stephen Colgan, San Francisco, CA (US); Charles McCauley Ross, Los Altos, CA (US)

(73) Assignee: BLUE RIVER TECHNOLOGY INC., Santa Clara, CA (US)

( * ) Notice: Subject to any disclaimer, the term of this patent is extended or adjusted under 35 U.S.C. 154(b) by 0 days.

(21) Appl. No.: 18/360,756

(22) Filed: Jul. 27, 2023

(65) Prior Publication Data
US 2024/0037676 A1 Feb. 1, 2024

Related U.S. Application Data

(63) Continuation of application No. 18/170,551, filed on Feb. 17, 2023, now Pat. No. 11,756,136, which is a
(Continued)

(51) Int. Cl.
*G06Q 50/02* (2024.01)
*A01M 7/00* (2006.01)
(Continued)

(52) U.S. Cl.
CPC ............ *G06Q 50/02* (2013.01); *A01M 7/0071* (2013.01); *G01N 21/255* (2013.01);
(Continued)

(58) Field of Classification Search
CPC ............ G06Q 50/02; G01N 2021/8466; G01N 21/255; G01N 21/84; G01N 33/0098;
(Continued)

(56) References Cited

U.S. PATENT DOCUMENTS

| 7,329,168 B2 * | 2/2008 | Hofmann | ................ B24B 49/00 700/121 |
| 2004/0153284 A1 * | 8/2004 | Bernstein | ............... G06V 20/13 382/100 |

(Continued)

FOREIGN PATENT DOCUMENTS

| JP | 2009281931 A | * 12/2009 | ......... G06K 9/00664 |
| JP | 2009281931 A | 12/2009 | |
| WO | WO 2016/144795 A1 | 9/2016 | |

OTHER PUBLICATIONS

European Patent Office, Extended European Patent Application No. 21753713.3, Oct. 26, 2023, 8 pages.
(Continued)

*Primary Examiner* — Jeffrey P Aiello
(74) *Attorney, Agent, or Firm* — Fenwick & West LLP

(57) ABSTRACT

A farming machine is configured to identify and treat plants in a field. The farming machine includes one or more light sensors for measuring a characteristic of light. The one or more light sensors are coupled to the farming machine and are directed a substantially upwards orientation away from the plants. A control system adjusts settings of an image acquisition system based on a characteristic of light measured by the one or more light sensors. The image acquisition system captures an image of a plant using one or more image sensors coupled to the farming machine, the one or more image sensors directed in a substantially downwards orientation towards the plants. The control system identifies a plant in the image and actuates a treatment mechanism to treat the identified plant.

20 Claims, 12 Drawing Sheets

Related U.S. Application Data continuation of application No. 16/789,406, filed on Feb. 12, 2020, now Pat. No. 11,615,486.

(51) Int. Cl.
  *G01N 21/25* (2006.01)
  *G06T 7/00* (2017.01)
  *G06V 10/60* (2022.01)
  *G06V 20/00* (2022.01)

(52) U.S. Cl.
  CPC ............ *G06T 7/0004* (2013.01); *G06V 10/60* (2022.01); *G06V 20/38* (2022.01); *G06T 2207/30188* (2013.01)

(58) Field of Classification Search
  CPC .......... G06T 2207/30188; G06V 10/60; G06V 20/38; A01B 79/005
  USPC .................. 47/1.43; 340/540, 991; 348/143; 356/401, 600, 625; 382/110, 100, 181; 700/108; 701/50; 702/19, 150, 189, 2, 702/152, 188, 127, 159, 40, 104, 1
  See application file for complete search history.

(56) References Cited

U.S. PATENT DOCUMENTS

| | | | |
|---|---|---|---|
| 2007/0035815 A1* | 2/2007 | Edgar | H04N 1/628 359/359 |
| 2007/0065857 A1* | 3/2007 | Glaser | G01N 21/3563 435/6.12 |
| 2008/0267445 A1* | 10/2008 | Capewell | G01N 35/021 382/100 |
| 2016/0255778 A1* | 9/2016 | Redden | A01M 21/04 |
| 2018/0330165 A1* | 11/2018 | Halligan | G06V 20/188 |
| 2019/0150357 A1* | 5/2019 | Wu | H04N 7/188 |
| 2019/0259108 A1* | 8/2019 | Bongartz | A01G 31/02 |
| 2019/0261581 A1* | 8/2019 | Redden | A01C 21/002 |
| 2019/0362146 A1 | 11/2019 | Polzounov et al. | |
| 2019/0392239 A1* | 12/2019 | Ferrari | A01B 79/005 |
| 2020/0187433 A1* | 6/2020 | Redden | A01M 7/0042 |

OTHER PUBLICATIONS

Dronefly, "Best Drones for Agriculture and Farming: Crop Inspection & Analysis," Date Unknown, four pages, Retrieved from the Internet <URL:https://www.dronefly.com/blogs/news/how-are-drones-used-for-agriculture/>.

PCT International Search Report and Written Opinion, PCT Application No. PCT/US21/17127, Apr. 23, 2021, 14 pages.

United States Office Action, U.S. Appl. No. 16/789,406, filed Jul. 5, 2022, 20 pages.

United States Office Action, U.S. Appl. No. 16/789,406, filed Oct. 11, 2022, 22 pages.

United States Office Action, U.S. Appl. No. 18/170,551, filed Jun. 29, 2023, 7 pages.

\* cited by examiner

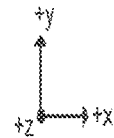
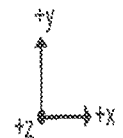
FIG. 4C
FIG. 4D

UPWARD FACING LIGHT SENSOR FOR PLANT DETECTION

CROSS REFERENCE TO RELATED APPLICATIONS

This application is a continuation of U.S. application Ser. No. 18/170,551, now U.S. Pat. No. 11,756,136, filed Feb. 17, 2023, which is a continuation of U.S. application Ser. No. 16/789,406, filed Feb. 12, 2020, now U.S. Pat. No. 11,615,486, which is incorporated by reference in its entirety.

TECHNICAL FIELD

The described subject matter generally relates to identification and treatment of plants, and more specifically to identification and treatment of plants in a field using an upward facing light sensor.

BACKGROUND

Conventional systems for treating crops in a field broadly apply treatment to all plants in the field or to entire zones of plants within the field. These systems have significant drawbacks as they often apply the same treatment to the entire field of plants. For example, in the case of a spray type treatment, treatment fluid is applied throughout the zone or field, resulting in significant waste. When the treatment is a nitrogen-containing fertilizer, excess treatment is harmful to the environment in aggregate. Further, in conventional spray treatment systems, crops and weeds are treated collectively. Thus, in the case of fertilizer treatments, weeds may benefit from treatment unless separate effort is expended to remove weeds before treatment.

Currently, it is difficult to apply treatments to individual plants rather than large areas of the field. In an example, farmers manually apply treatment to individual plants which does not affect both weeds and crops. This and similar methods are exceptionally labor-intensive and costly when performed at industrial scale. While some conventional farming systems use imaging technology to identify and treat crops in a field (e.g., satellite imaging, color imaging, thermal imaging, etc.), many of these systems are limited in their ability to properly identify and treat plants at the individual plant level. For example, satellite images have poor resolution for detecting individual plants and color based imaging systems treat all green plants equally whether they are a weed or a crop.

SUMMARY

A farming machine identifies a plant for treatment using a light measurement system and an image acquisition system as the farming machine travels through a field of plants. A treatment mechanism coupled to the farming machine treats the identified plant as the farming machine travels past the identified plant in the field. The light measurement system includes a light sensor coupled to the farming machine. The light measurement system includes one or more light sensors directed in an upwards orientation away from the plants in the field. The light measurement system measures a characteristic of light (e.g., intensity, color temperature) incident on the light sensor. The farming machine adjusts one or more settings of the image acquisition system based on the measured characteristic of incident light. The settings may include, for example, ISO, shutter speed, white balance, aperture, etc. The image acquisition system captures an image of a plant using an image sensor coupled to the farming machine. The image sensor is directed in a downwards orientation towards the plants in the field. A control system identifies a plant in the image. The control system actuates the treatment mechanism to treat the plant identified in the image captured by the image acquisition system as the farming machine travels past the plant in the field.

BRIEF DESCRIPTION OF DRAWINGS

FIG. 4C illustrates a third configuration of a farming machine including a light sensor and an image sensor, in accordance with one embodiment.

FIG. 4D illustrates a fourth configuration of a farming machine including a light sensor and an image sensor, in accordance with one embodiment.

Figure 1A:
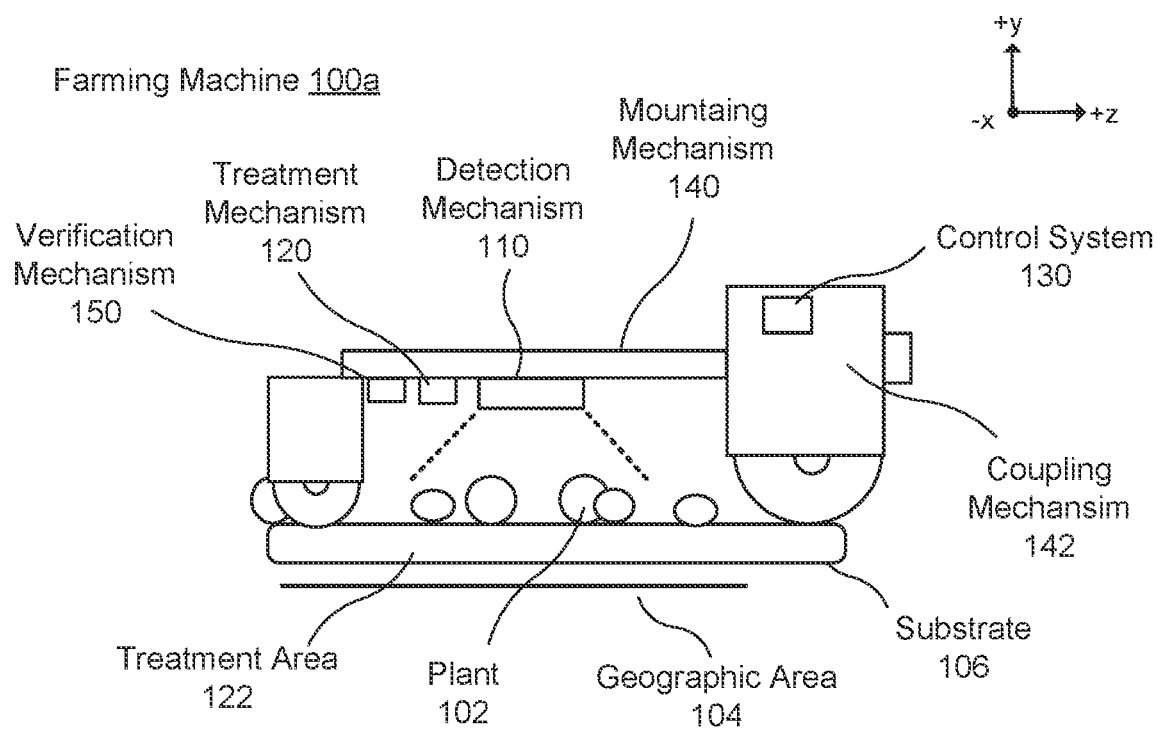
FIG. 1A illustrates a side view of a farming machine, in accordance with a first example embodiment.

The figures and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality

DETAILED DESCRIPTION

I. Introduction

A farming machine includes an automated or semi-automated system for identifying and treating plants in a field. The farming machine employs an image acquisition system to identify plants for treatment as the farming machine travels through the field. A control system automatically actuates a treatment mechanism coupled to the farming machine to treat an identified plant. As such, the system targets and treats plants individually, thus reducing waste and preventing weed growth resulting from treatments that are applied liberally across a field. Using an automated system also reduces manual labor and other costs associated with treating plants individually, improving farming efficiency.

In some example systems, an image acquisition system uses one or more image sensors to capture an image of a plant to identify a plant for treatment. However, the quality of an image captured by an image sensor is often subject to environmental conditions. For example, images captured at different times of day and in different weather conditions vary depending on the characteristics of the available light. To illustrate, an image captured on a sunny day appears extremely bright compared to an image captured on an overcast day. The difference in light may negatively affect the identification of a plant in the image. For example, a plant in the image may be identified incorrectly (e.g., identified as a weed when it is a crop), an unhealthy plant may appear healthy in the image, and a location of the plant in the field may be misidentified.

Misidentification of plants may lead to a farming machine improperly treating the misidentified plants. For example, a farming machine captures an image of a plant in the early morning such that its color appears darker in the image than in reality. The farming machine incorrectly identifies the plant as an unhealthy because of its seemingly dark appearance. The farming machine treats the misidentified plant accordingly (e.g., the plant is removed, killed, etc.). However, in appropriate lighting (e.g., later in the day), the farming machine captures an image of the plant and its color indicates, appropriately, that it is healthy. In this case, the farming machine does not incorrectly treat the plant. Thus, farming machines including traditional image acquisition systems may have limited hours and/or conditions of operation (e.g., from 10 am to 3 pm) such that plants are not misidentified and mistreated. A farming machine including an image system that determines characteristics of the light at the time of farming allows for improved accuracy of plant identification and treatment. Furthermore, a farming machine configured to determine light characteristics may lead to increased operational hours for the farming machine alongside improved effectiveness and efficiency. Described herein is a farming machine that uses a light measurement system to determine settings for an image acquisition system to identify a plant for treatment.

II. Plant Treatment System

Figure 1B:
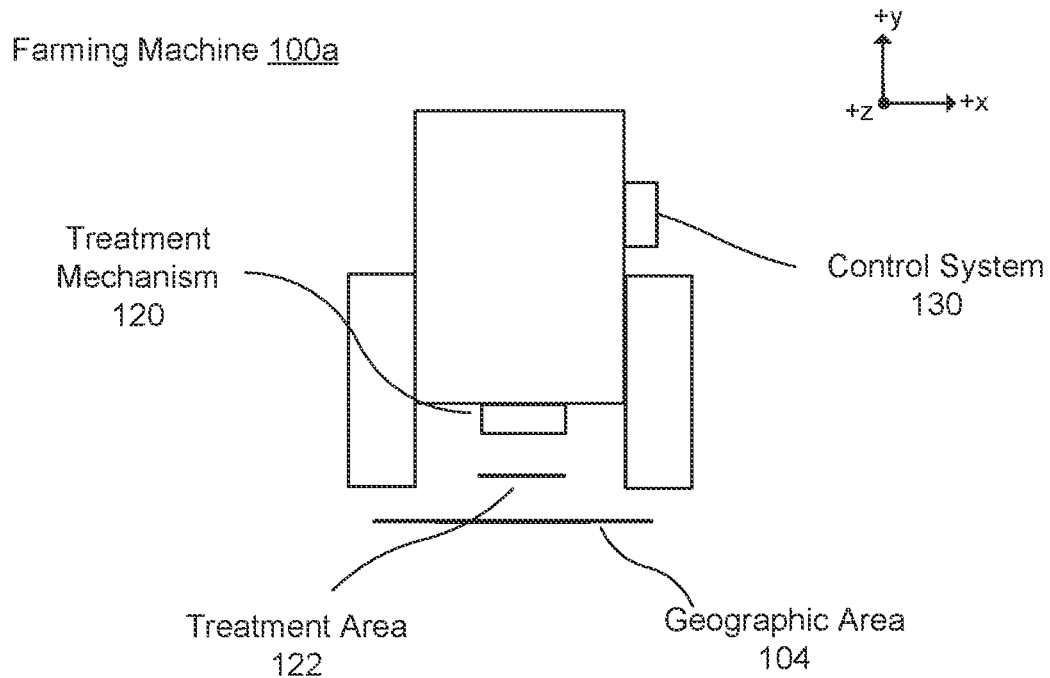
FIG. 1B illustrates a front view of a farming machine, in accordance with the first example embodiment.
Figure 1C:
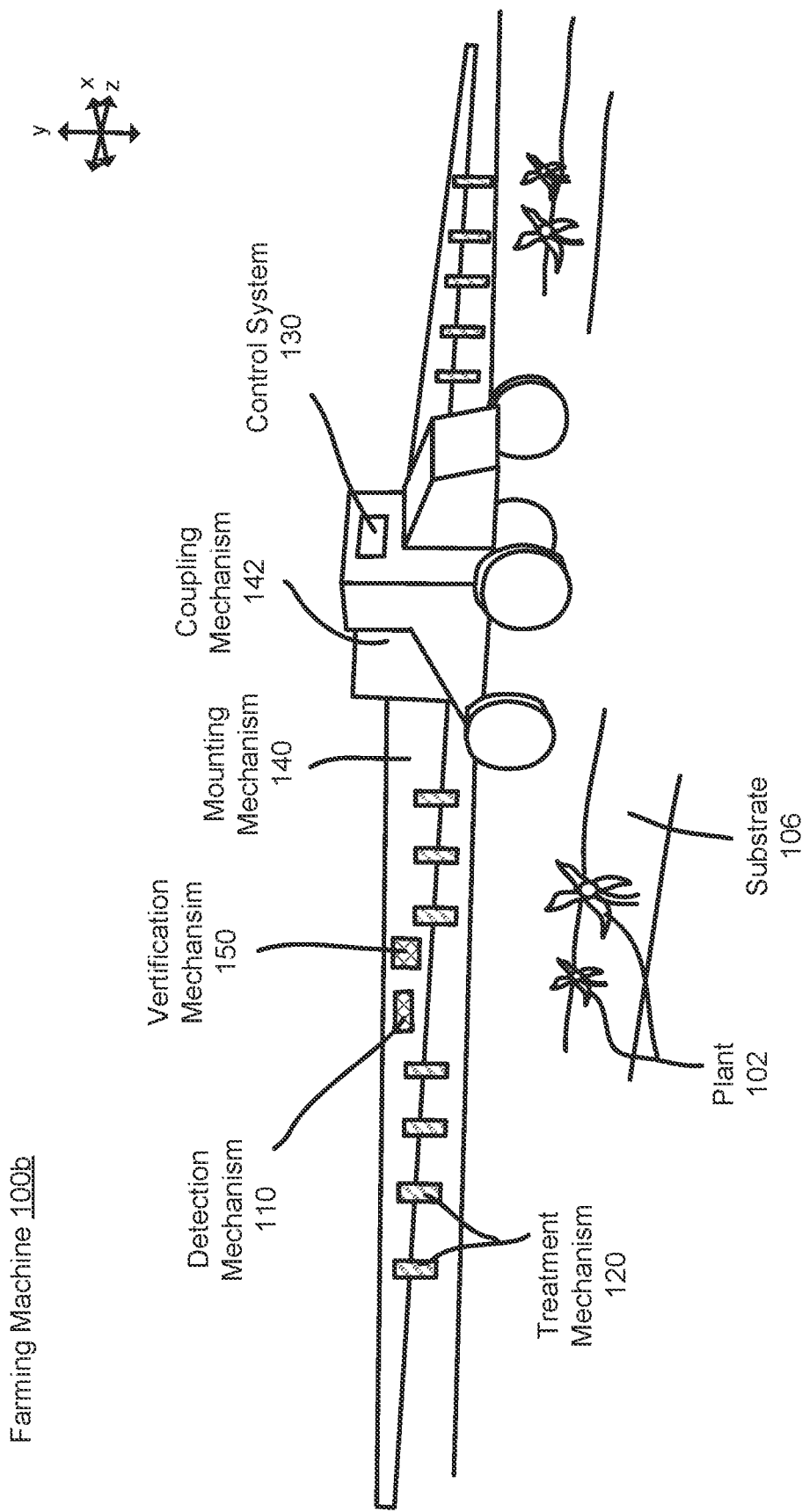
FIG. 1C illustrates an isometric view of a farming machine, in accordance with a second example embodiment.
Figure 1D:
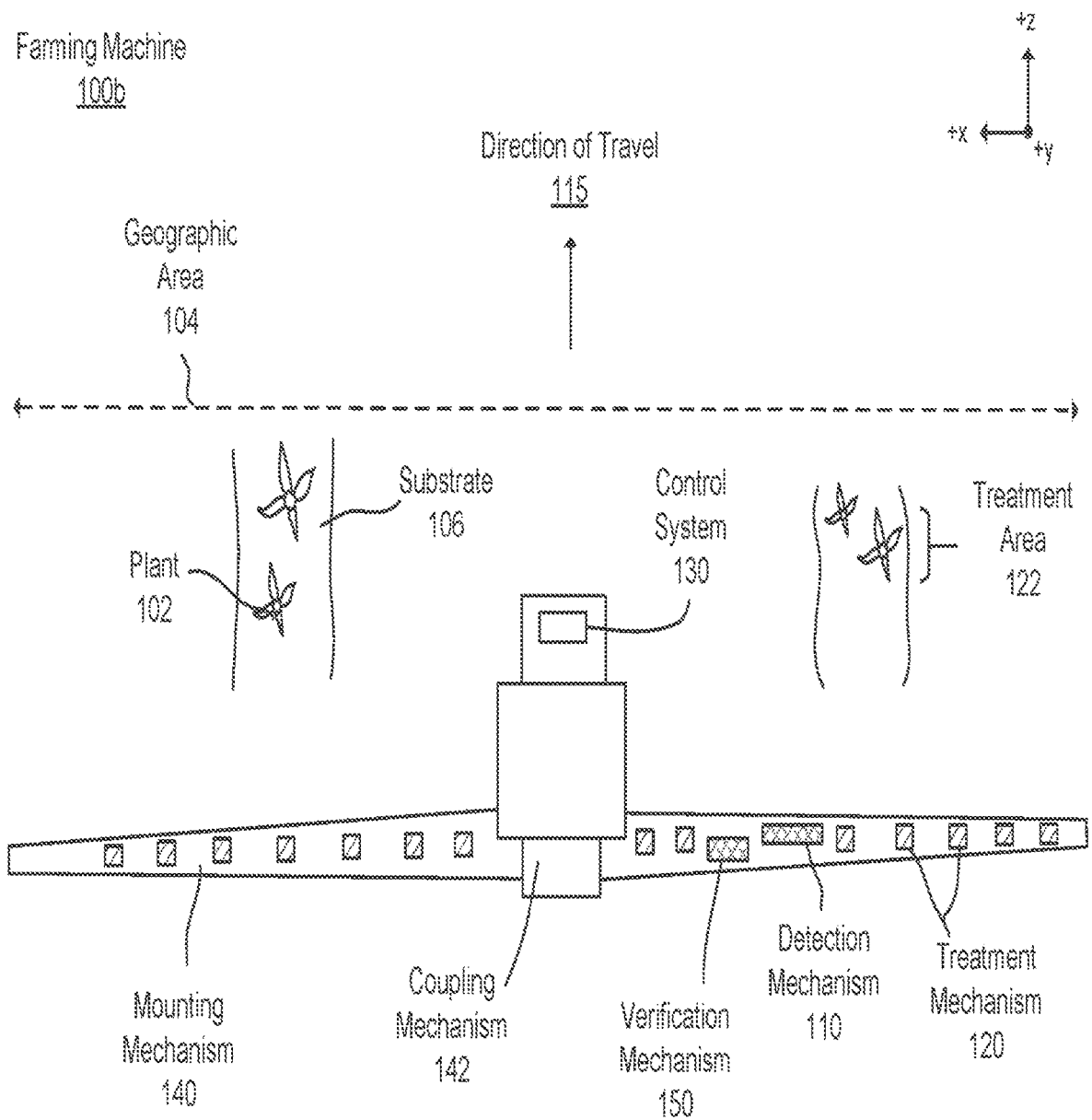
FIG. 1D illustrates a top view of a farming machine, in accordance with the second embodiment.
Figure 1E:
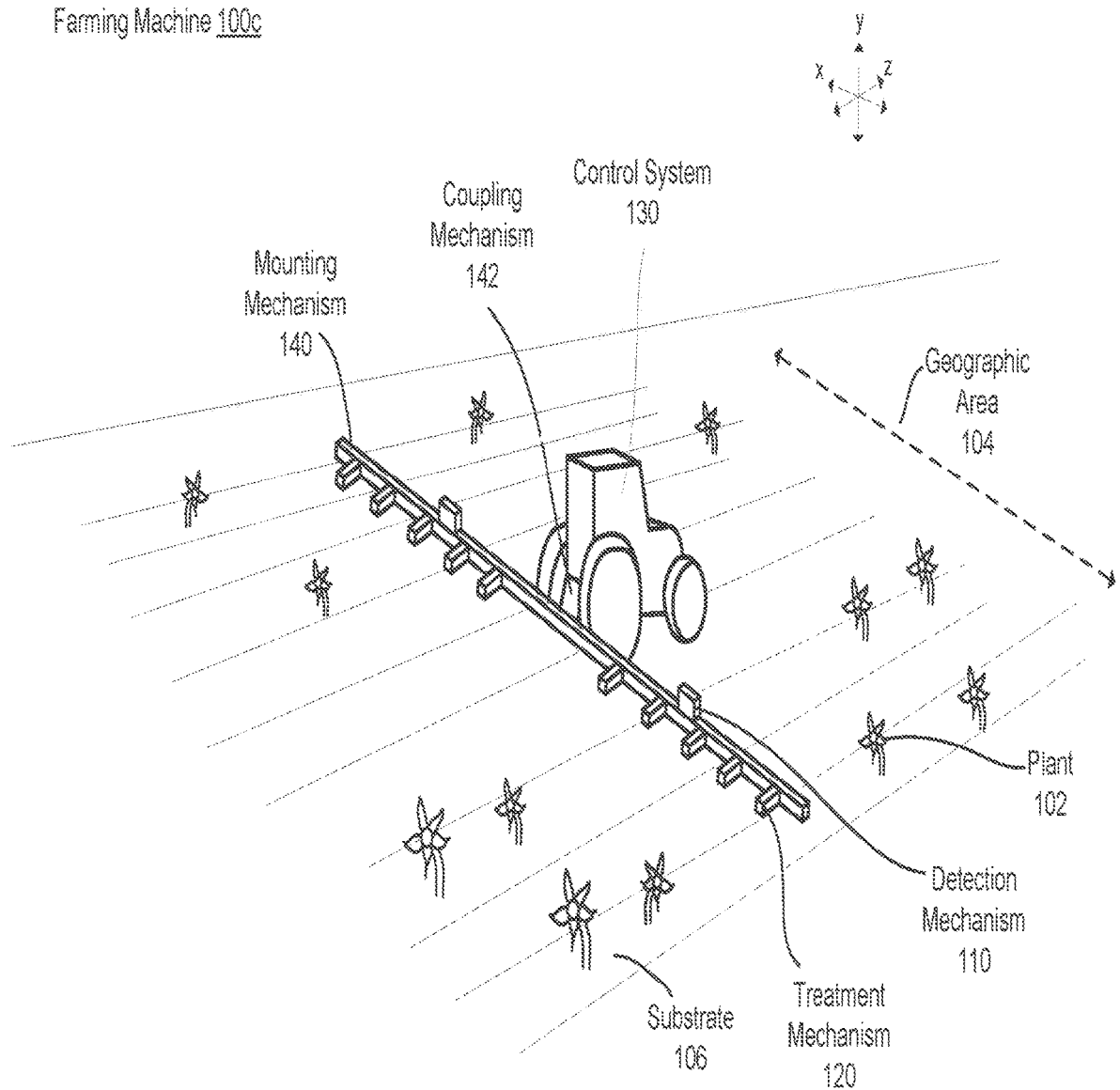
FIG. 1E illustrates an isometric view of a farming machine, in accordance with a third example embodiment.

A farming machine that identifies and treats plants may have a variety of configurations, some of which are described in greater detail below. For example, FIG. 1A is a side view of a first embodiment of a farming machine and FIG. 1B is a front view of the first embodiment of the farming machine of FIG. 1A. FIG. 1C is an isometric view of a second embodiment of a farming machine and FIG. 1D is a top view of the second embodiment of the farming machine of FIG. 1C. FIG. 1E is a third embodiment of a farming machine, in accordance with one embodiment. The farming machine 100, illustrated in FIGS. 1A-1E, includes a detection mechanism 110, a treatment mechanism 120, and a control system 130. The farming machine 100 can additionally include a mounting mechanism 140, a verification mechanism 150, a power source, digital memory, communication apparatus, or any other suitable component. The farming machine 100 can include additional or fewer components than described herein. Furthermore, the components of the farming machine 100 can have different or additional functions than described below.

The farming machine 100 functions to apply a treatment to one or more plants 102 within a geographic area 104. Often, treatments function to regulate plant growth. The treatment is directly applied to a single plant 102 (e.g., hygroscopic material), but can alternatively be directly applied to multiple plants, indirectly applied to one or more plants, applied to the environment associated with the plant (e.g., soil, atmosphere, or other suitable portion of the plant environment adjacent to or connected by an environmental factor, such as wind), or otherwise applied to the plants. Treatments that can be applied include necrosing the plant, necrosing a portion of the plant (e.g., pruning), regulating plant growth, or any other suitable plant treatment. Necrosing the plant can include dislodging the plant from the supporting substrate 106, incinerating a portion of the plant, applying a treatment concentration of working fluid (e.g., fertilizer, hormone, water, etc.) to the plant, or treating the plant in any other suitable manner. Regulating plant growth can include promoting plant growth, promoting growth of a plant portion, hindering (e.g., retarding) plant or plant portion growth, or otherwise controlling plant growth. Examples of regulating plant growth includes applying growth hormone to the plant, applying fertilizer to the plant or substrate, applying a disease treatment or insect treatment to the plant, electrically stimulating the plant, watering the plant, pruning the plant, or otherwise treating the plant. Plant growth can additionally be regulated by pruning, necrosing, or otherwise treating the plants adjacent the plant.

The plants 102 can be crops, but can alternatively be weeds or any other suitable plant. The crop may be cotton, but can alternatively be lettuce, soy beans, rice, carrots, tomatoes, corn, broccoli, cabbage, potatoes, wheat or any other suitable commercial crop. The plant field in which the system is used is an outdoor plant field, but can alternatively be plants within a greenhouse, a laboratory, a grow house, a set of containers, a machine, or any other suitable environment. The plants are grown in one or more plant rows (e.g., plant beds), wherein the plant rows are parallel, but can alternatively be grown in a set of plant pots, wherein the plant pots can be ordered into rows or matrices or be randomly distributed, or be grown in any other suitable configuration. The crop rows are generally spaced between 2 inches and 45 inches apart (e.g. as determined from the longitudinal row axis), but can alternatively be spaced any suitable distance apart, or have variable spacing between multiple rows.

The plants 102 within each plant field, plant row, or plant field subdivision generally includes the same type of crop (e.g. same genus, same species, etc.), but can alternatively include multiple crops (e.g., a first and a second crop), both of which are to be treated. Each plant 102 can include a stem, arranged superior (e.g., above) the substrate 106, which supports the branches, leaves, and fruits of the plant. Each plant can additionally include a root system joined to the stem, located inferior the substrate plane (e.g., below ground), that supports the plant position and absorbs nutrients and water from the substrate 106. The plant can be a vascular plant, non-vascular plant, ligneous plant, herbaceous plant, or be any suitable type of plant. The plant can have a single stem, multiple stems, or any number of stems. The plant can have a tap root system or a fibrous root system. The substrate 106 is soil, but can alternatively be a sponge or any other suitable substrate.

The detection mechanism 110 is configured to identify a plant for treatment. As such, the detection mechanism 110 can include one or more sensors for identifying a plant. For example, the detection mechanism 110 can include a multispectral camera, a stereo camera, a CCD camera, a single lens camera, hyperspectral imaging system, LIDAR system (light detection and ranging system), dyanmometer, IR camera, thermal camera, humidity sensor, light sensor, temperature sensor, or any other suitable sensor. In the embodiment of FIGS. 2-5 and described in greater detail below, the detection mechanism 110 includes an image sensor configured to capture an image of a plant. In some example systems, the detection mechanism 110 is mounted to the mounting mechanism 140, such that the detection mechanism 110 traverses over a geographic location before the treatment mechanism 120 as the farming machine 100 moves traverses through the geographic location. However, in some embodiments, the detection mechanism 110 traverses over a geographic location at substantially the same time as the treatment mechanism 120. In an embodiment of the farming machine 100, the detection mechanism 110 is statically mounted to the mounting mechanism 140 proximal the treatment mechanism 120 relative to the direction of travel 115. In other systems, the detection mechanism 110 can be incorporated into any other component of the farming machine 100.

The treatment mechanism 120 functions to apply a treatment to an identified plant 102. The treatment mechanism 120 applies the treatment to the treatment area 122 as the farming machine 100 moves in a direction of travel 115. The effect of the treatment can include plant necrosis, plant growth stimulation, plant portion necrosis or removal, plant portion growth stimulation, or any other suitable treatment effect as described above. The treatment can include plant 102 dislodgement from the substrate 106, severing the plant (e.g., cutting), plant incineration, electrical stimulation of the plant, fertilizer or growth hormone application to the plant, watering the plant, light or other radiation application to the plant, injecting one or more working fluids into the substrate 106 adjacent the plant (e.g., within a threshold distance from the plant), or otherwise treating the plant. The treatment mechanism 120 is operable between a standby mode, wherein the treatment mechanism 120 does not apply a treatment, and a treatment mode, wherein the treatment mechanism 120 is controlled by the control system 130 to apply the treatment. However, the treatment mechanism 120 can be operable in any other suitable number of operation modes.

The farming machine 100 may include one or more treatment mechanisms 120. A treatment mechanism 120 may be fixed (e.g., statically coupled) to the mounting mechanism 140 or attached to the farming machine 100 relative to the detection mechanism 110. Alternatively, the treatment mechanism 120 can rotate or translate relative to the detection mechanism 110 and/or mounting mechanism 140. In one variation, such as in FIGS. 1A-1B, the farming machine 100a includes a single treatment mechanism, wherein the treatment mechanism 120 is actuated or the farming machine 100a moved to align the treatment mechanism 120 active area 122 with the targeted plant 102. In a second variation, the farming machine 100 includes an assembly of treatment mechanisms, wherein a treatment mechanism 120 (or subcomponent of the treatment mechanism 120) of the assembly is selected to apply the treatment to the identified plant 102 or portion of a plant in response to identification of the plant and the plant position relative to the assembly. In a third variation shown, such as in FIGS. 1C-1E, the farming machine (i.e., 100b, 100c) includes an array of treatment mechanisms 120, wherein the treatment mechanisms 120 are actuated or the farming machine (i.e., 100b, 100c) is moved to align the treatment mechanism 120 active areas 122 with the targeted plant 102 or plant segment.

The farming machine 100 includes a control system 130 for controlling operations of system components. The control system can receive information from and/or provide input to the detection mechanism 110, the verification mechanism 150, and the treatment mechanism 120. In some embodiments, the control system 130 may be configured to control operating parameters of the farming machine 100 (e.g., speed, direction). The control system 130 also controls operating parameters of the detection mechanism 110. Operating parameters of the detection mechanism 110 may include processing time, location and/or angle of the detection mechanism 110, image capture intervals, image capture settings, etc. The control system 130 may be a computer, as described in greater detail below in relation to FIG. 7. The control system 130 may be coupled to the farming machine 100 such that an operator (e.g., a driver) can interact with the control system 130. In other embodiments, the control system 130 is physically removed from the farming machine 100 and communicates with system components (e.g., detection mechanism 110, treatment mechanism 120, etc.) wirelessly.

In some configurations, the farming machine 100 includes a mounting mechanism 140 that functions to provide a mounting point for the system components. In one example, as shown in FIG. 1A-1B, the mounting mechanism 140 statically retains and mechanically supports the positions of the detection mechanism 110, the treatment mechanism 120, and the verification mechanism 150 relative to a longitudinal axis of the mounting mechanism 140. The mounting mechanism 140 is a chassis or frame, but can alternatively be any other suitable mounting mechanism. In the embodiment of FIGS. 1C-1E, the mounting mechanism 140 extends outward from a body of the farming machine (i.e., 100b, 100c) in the positive and negative x-direction (in the illustrated orientation of FIGS. 1A-1E) such that the mounting mechanism 140 is approximately perpendicular to the direction of travel 115. The mounting mechanism 140 in FIGS. 1C-1E includes an array of treatment mechanisms 120 positioned laterally along the mounting mechanism 140. In alternate configurations, there may be no mounting mechanism 140, the mounting mechanism 140 may be alternatively positioned, or the mounting mechanism 140 may be incorporated into any other component of the farming machine 100.

The farming machine 100 includes a first set of coaxial wheels and a second set of coaxial wheels, wherein the rotational axis of the second set of wheels is parallel with the rotational axis of the first set of wheels. In the first embodiment, each wheel in each set is arranged along an opposing side of the mounting mechanism 140 such that the rotational axes of the wheels are approximately perpendicular to the mounting mechanism 140. In the second and third embodiments of the farming machine, the rotational axes of the wheels are approximately parallel to the mounting mechanism 140. In alternative embodiments, the system can include any suitable number of wheels in any suitable configuration. The farming machine 100 may also include a coupling mechanism 142, such as a hitch, that functions to removably or statically couple to a drive mechanism, such as a tractor, more to the rear of the drive mechanism (such that the farming machine 100 is dragged behind the drive mechanism), but can alternatively be attached to the front of the drive mechanism or to the side of the drive mechanism. Alternatively, the farming machine 100 can include the drive mechanism (e.g., a motor and drive train coupled to the first and/or second set of wheels). In other example systems, the system may have any other means of traversing through the field.

In some configurations, the farming machine 100 additionally include a verification mechanism 150 that functions to record a measurement of the ambient environment of the farming machine 100. The farming machine may be use the measurement to verify or determine the extent of plant treatment. The verification mechanism 150 records a measurement of the geographic area previously measured by the detection mechanism 110. The verification mechanism 150 records a measurement of the geographic region encompassing the plant treated by the treatment mechanism 120. The verification mechanism 150 measurement can additionally be used to empirically determine (e.g., calibrate) treatment mechanism operation parameters to obtain the desired treatment effect. The verification mechanism 150 can be substantially similar (e.g., be the same type of mechanism as) the detection mechanism 110, or can be different from the detection mechanism 110. In some embodiments, the verification mechanism 150 is arranged distal the detection mechanism 110 relative the direction of travel, with the treatment mechanism 120 arranged there between, such that the verification mechanism 150 traverses over the geographic location after treatment mechanism 120 traversal. However, the mounting mechanism 140 can retain the relative positions of the system components in any other suitable configuration. In other configurations of the farming machine 100, the verification mechanism 150 can be included in other components of the system.

In some configurations, the farming machine 100 may additionally include a power source, which functions to power the system components, including the detection mechanism 110, control system 130, and treatment mechanism 120. The power source can be mounted to the mounting mechanism 140, can be removably coupled to the mounting mechanism 140, or can be separate from the system (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the farming machine 100.

In some configurations, the farming machine 100 may additionally include a communication apparatus, which functions to communicate (e.g., send and/or receive) data between the control system 130 and a set of remote devices. The communication apparatus can be a Wi-Fi communication system, a cellular communication system, a short-range communication system (e.g., Bluetooth, NFC, etc.), or any other suitable communication system.

III. System Environment

As described above, a farming machine (e.g., farming machine 100) may operate in different conditions (e.g., at different times of day, in different weather conditions, etc.) and the characteristics of light at the time of operation may vary. The characteristics of light may affect operation of the detection mechanism 110, which, in turn, affects how a farming machine identifies and treats plants. As such, a farming machine may include a light measurement system configured to evaluate characteristics of light in order to improve plant identification and treatment.

Figure 2:
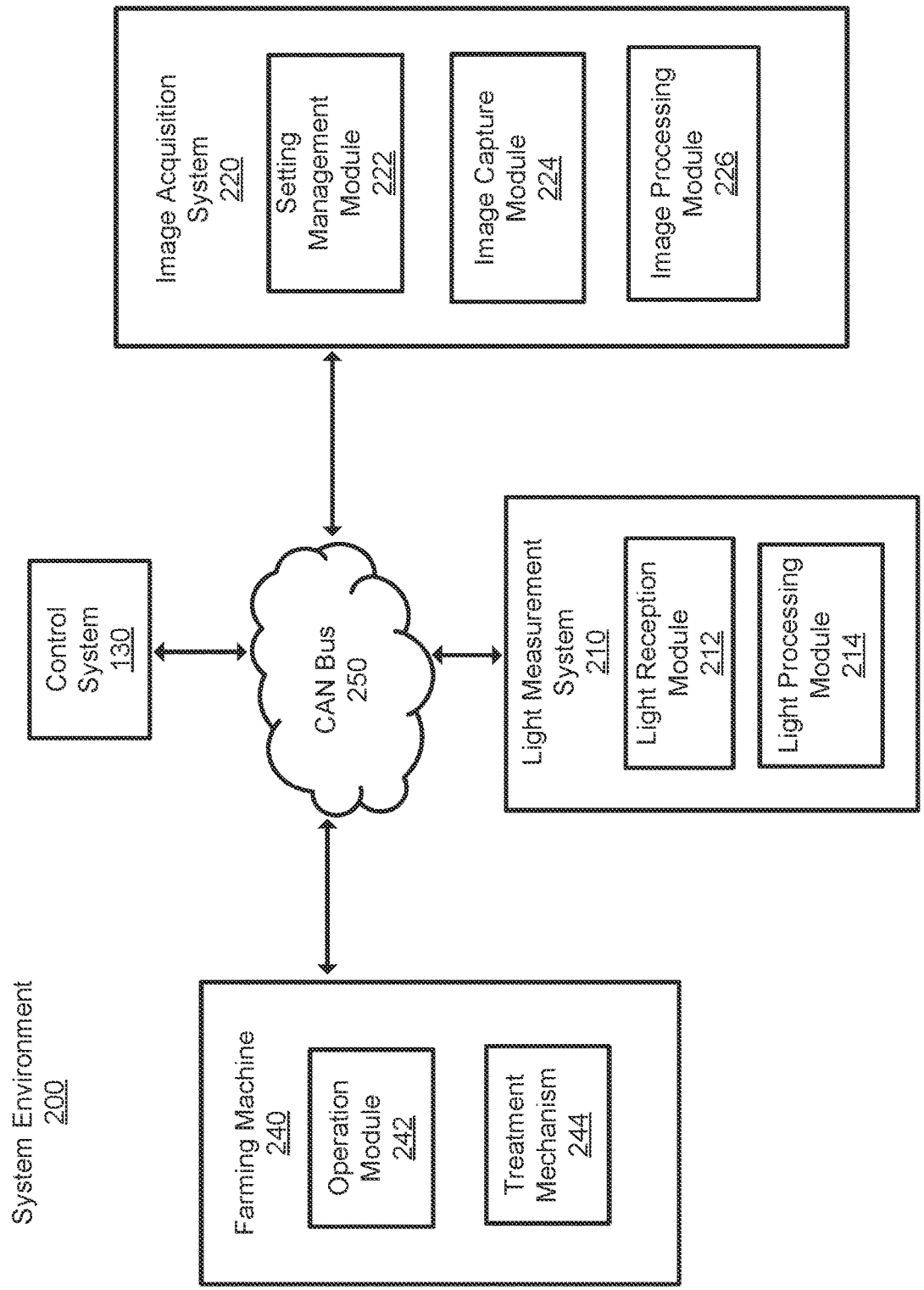
FIG. 2 illustrates a system environment for identifying and treating a plant, in accordance with one embodiment.

FIG. 2 illustrates a system environment for identifying and treating plants, according to one embodiment. The system environment 200 includes a light measurement system 210, an image acquisition system 220, a control system 130, and a farming machine 240 (e.g., farming machine 100) connected via a Controller Area Network (CAN) bus 250. In alternative embodiments, the system environment 200 includes additional or fewer components than described herein. The functions of the components may also be distributed in a different manner than described below.

The light measurement system 210 is configured to receive and process light incident on a light sensor ("incident light"). The light measurement system 210 includes a light reception module 212 and a light processing module 214. The light reception module 212 includes a light sensor and detects incident light. The light reception module 212 is described in greater detail below in relation to FIG. 3. In some embodiments, the light reception module 212 detects incident light in a visible and/or infrared spectrum, but other spectrums of electromagnetic radiation are also possible (e.g., ultraviolet). The light processing module 214 analyzes one or more characteristics of the incident light. The characteristics can include, for example, intensity, brightness, and color temperature. In alternative embodiments, the light processing module 214 evaluates fewer or additional characteristics of incident light. The light measurement system 210 provides one or more measured characteristics of incident light to the image acquisition system 220 and/or the control system 130 via the CAN bus 250.

The image acquisition system 220 is configured to capture an image of a plant. The image acquisition system 220 includes a setting management module 222, an image capture module 224, and an image processing module 226. In alternative embodiments, the image acquisition system 220 includes fewer or greater components than described herein.

The setting management module 222 is configured to adjust one or more settings of the image capture module 224. Settings are selectable parameters that, when changed, alter a configuration of the image sensor and, thereby, change how an image sensor captures an image. Generally, settings are selected such that the image sensor captures an image with a proper exposure. Exposure is the amount of light per unit area on an image sensor and may affect how light or dark an image appears. Here, a proper exposure is an exposure that allows the farming machine to accurately identify a plant in the image.

In some examples, the setting management module 222 adjusts exposure settings (e.g., aperture, shutter speed, ISO speed) and white balance. In other examples, the setting management module 222 is configured to adjust additional settings (e.g., focus, flash, zoom, etc.) of the image capture module 224. The setting management module 222 may be configured to adjust one or more settings at regular time intervals, at a specified time, each time the system resets, randomly, based on input from the control system 130, or according to other suitable methods.

In one embodiment, the setting management module 222 adjusts one or more settings based on a measured characteristic of light determined by the light measurement system 210. For example, the light measurement system 210 measures an intensity of 120,000 lux (e.g., on a sunny day), and in response, the setting management module 222 reduces the shutter speed of the image capture module 224. In another example, the light measurement system 210 measures a cool color temperature (e.g., on an overcast day), and the setting management module 222 adjusts the white balance of the image capture module 224 to a warmer temperature. In some embodiments, the setting management module 222 adjusts the settings of the image capture module 224 responsive to detecting a change in a characteristic of light measured by the light measurement system 210. The setting management module 222 may also adjust settings of the image capture module 224 based on additional criteria. Some additional examples and criteria are described in greater detail below.

In some embodiments, the setting management module 222 adjusts the settings of the image capture module 224 according to specified settings. Specified settings are one or more settings for an image sensor that the setting management module 222 implements in specific circumstances. For example, the setting management module 222 implements a specific setting when the light measurement system 210 detects a specific measured characteristic of light. To illustrate, the image acquisition system 220 includes (i.e., in a datastore) a set of intensity ranges, with each intensity range including a range of light intensities. Each intensity range corresponds to a specific setting for an image sensor. The light measurement system 210 measures an intensity of light and the setting management module 222 compares the measured intensity to the set of intensity ranges. The setting management module 222 adjusts the settings of the light measurement system based on the specified setting associated with the intensity range including the measured intensity. To provide additional context, the light measurement system 210 measures an intensity of 95,000 lux, and the setting management module 222 compares the measured intensity to a set of intensity ranges. The setting management module 222 determines that the measured intensity in the range of 90,000 to 110,000 lux, which corresponds a shutter speed of 0.05 seconds. Thus, the setting management module 222 adjusts the shutter speed of the image capture module 224 to 0.05 seconds.

In other examples, the setting management module 222 compares a measured characteristic of light to a typical value for the characteristic and adjusts a setting according to one or more adjustment thresholds. The typical value of a characteristic can be an average value for an operating condition (e.g., on a sunny day, on a cloudy day, at a certain time of day, etc.), a randomly assigned value, a default value, a value determined by the control system 130, or any other appropriate value. Responsive to a difference between the measured characteristic and a corresponding typical value exceeding an adjustment threshold, the setting management module 222 adjusts one or more settings. For example, a typical value of intensity is 50,000 lux, and the adjustment threshold is 20,000 lux. The light measurement system 210 measures an incident intensity of 90,000 lux. The setting management module 222 determines that the difference between the measured value and the typical value exceeds the adjustment threshold and adjusts a setting (e.g., aperture, ISO speed, etc.) accordingly. On the other hand, responsive to determining the difference does not meet the adjustment threshold, the setting management module 222 ignores the difference (i.e., the settings are not changed). In other embodiments, the setting management module 222 can adjust one or more settings according to other suitable parameters.

The image capture module 224 is configured to capture an image of a plant for treatment. The image capture module 224 has initial settings (e.g., default settings when the system turns on, resets, etc.) that can be adjusted by the setting management module 222. In some embodiments, initial settings of the image capture module 224 are settings corresponding to an operational condition (e.g., settings for a typical sunny day in the spring, for a certain time of day, etc.). In some cases, an operator of the farming machine may input the operational condition such that the initial settings are appropriate. In other embodiments, the initial settings can be randomly assigned, set by the control system 130, set by an operator, or determined according to any appropriate method. The setting management module 222 continuously monitors and adjusts the settings of the image capture module 224 during operation. The image capture module 224 can be configured to capture an image(s) at specified intervals, at a specified time, at random time intervals, as determined by the control system 130, or according to any other suitable guidelines.

The image processing module 226 processes an image captured by the image capture module 224. Processing the image includes evaluating and/or modifying image qualities, identifying a plant in the image, and/or evaluating plant properties. Modifying the image can include resizing, debayering, cropping, value normalization, and adjusting image qualities such as contrast, brightness, exposure, temperature, etc. Identifying the plant can include determining the type of plant and/or the location of the plant. In some embodiments, evaluating plant properties also includes determining other characteristics of the plant identified in the image and adjusting settings appropriately. Some characteristics of the plant may include, for example, Normalized Difference Vegetation Index (NDVI), Transformed Chlorophyll Absorption in Reflectance Index normalized by Optimized Soil-Adjusted Vegetation Index (TCARI/OSAVI), Normalized Difference Red Edge Index (NDRE), Canopy Chlorophyll Content Index (CCCI), Photochemical Reflectance Index (PRI), etc. Additionally, the image processing module 226 can evaluate plant properties to determine if the plant is healthy and/or if the plant needs treatment. In an embodiment, the image processing module employs a plant identification model to identify a plant, a plant type, plant features, etc. An example of a plant identification model employed by the image processing model is described in U.S. patent application Ser. No. 16/126,842 titled "Semantic Segmentation to Identify and Treat Plants in a Field and Verify the Plant Treatments," filed on Sep. 10, 2018, but other plant identification models are also possible.

In an embodiment, evaluating plant properties includes determining a perceived reflectance of an identified plant and comparing the perceived reflectance with an actual reflectance of the identified plant. Actual reflectance is a constant material property (e.g., a plant has a known reflectance value). However, a perceived reflectance of a plant varies based on the available light. The image processing module 226 may incorrectly identify a plant and/or plant characteristics if the perceived reflectance is different from the actual reflectance. For example, on a sunny day a plant may have a perceived reflectance greater than its actual reflectance and the image processing module misidentifies the plant's type. Accordingly, the image processing module 226 is configured to determine a difference between the actual reflectance and the perceived reflectance of an identified plant ("reflectance difference"). Determining a reflectance difference allows the image processing module 226 to improve plant identification and treatment in different operating conditions. In an embodiment, the image processing module 226 determines a reflectance difference by comparing the reflectance difference to a difference threshold. A difference threshold is a quantification of reflectance difference that causes the image processing module 226 to incorrectly identify plants. Responsive to the reflectance difference exceeding the difference threshold, the image processing module 226 recommends adjusting one or more settings of the image acquisition system 220. The setting management module 222 adjusts the settings of the image acquisition system 220 based on the reflectance difference of a target plant. Responsive to determining the reflectance difference does not meet the difference threshold, the image processing module 226 does not adjust the settings of the image acquisition system and/or transmits the reflectance difference to the control system 130 for further evaluation.

The control system 130, described above in relation to FIGS. 1A-1E, communicates with the light measurement system 210, the image acquisition system 220, and the farming machine 240 to control treatment of an identified plant. Specifically, the control system 130 evaluates a characteristic of light using the light measurement system 210 and captures an image using the image acquisition system 220. The control system 130 also communicates with the farming machine 240 via the CAN bus 250 to treat an identified plant. In some embodiments, the control system 130 actuates one or more treatment mechanisms 244. Instructions generated by the control system 130 may be transmitted to a treatment mechanism 244 using ethernet connections, CAN bus 250 connections, or another transmission protocol. In various embodiments, the control system 130 may perform actions prescribed to other systems and modules in the system environment 200. For example, the control system 130 may identify a plant rather than the image processing module 226. Similarly, the control system 130 may determine a setting for an image acquisition system 220. The control system 130 is described in greater detail below in relation to FIG. 7.

The farming machine 240 includes an operation module 242 and a treatment mechanism 244. The farming machine 240 may be any of the farming machines 100 described in relation to FIG. 1A-1E, or some other farming machine. The operation module 242 controls the operations (e.g., speed, direction) of the farming machine. In some embodiments, a user (e.g., a driver of a farming machine) provides input to the operation module 242 to affect operation of the farming machine 240, the light measurement system 210, or the image acquisition system 220. In other embodiments, the control system 130 controls the operation module 242 such that the farming machine 100 is semi-autonomous or autonomous (e.g., operates without user input). Additionally, the control system 130 controls the treatment mechanism 244 to treat identified plants. The treatment mechanism 244 can be a plurality of treatment devices and types, as described above in relation to FIGS. 1A-1E.

The Controller Area Network (CAN) bus 250 connects nodes of the system environment 200 to allow microcontrollers and devices to communicate with each other. In some embodiments, the components connected to the CAN bus 250 each have an input and output connection, and the CAN bus 250 acts as a translation mechanism for the components. For example, the CAN bus 250 receives input information from the light measurement system 210, processes the information, and transmits the information to the control system 130. The control system 130 determines a setting adjustment for the image acquisition system 220 based on the information received from the light measurement system 210 and transmits the setting adjustment to the image acquisition system 220. Further, the CAN bus 250 receives image data from the image acquisition system 220 and transmits image data to the control system 130. Based on the received information, the control system 130 selects one or more treatment mechanisms 244 to be actuated. The CAN bus 250 receives and transmits the information to the farming machine 240 in order to actuate a treatment mechanism 244. The CAN bus 250 can be any suitable network, such as the Internet, a LAN, a MAN, a WAN, a mobile wired or wireless network, a private network, a virtual private network, a direct communication line, and the like. The CAN bus 250 can also be a combination of multiple different networks of the same or different types.

IV. System Hardware

Figure 3A:
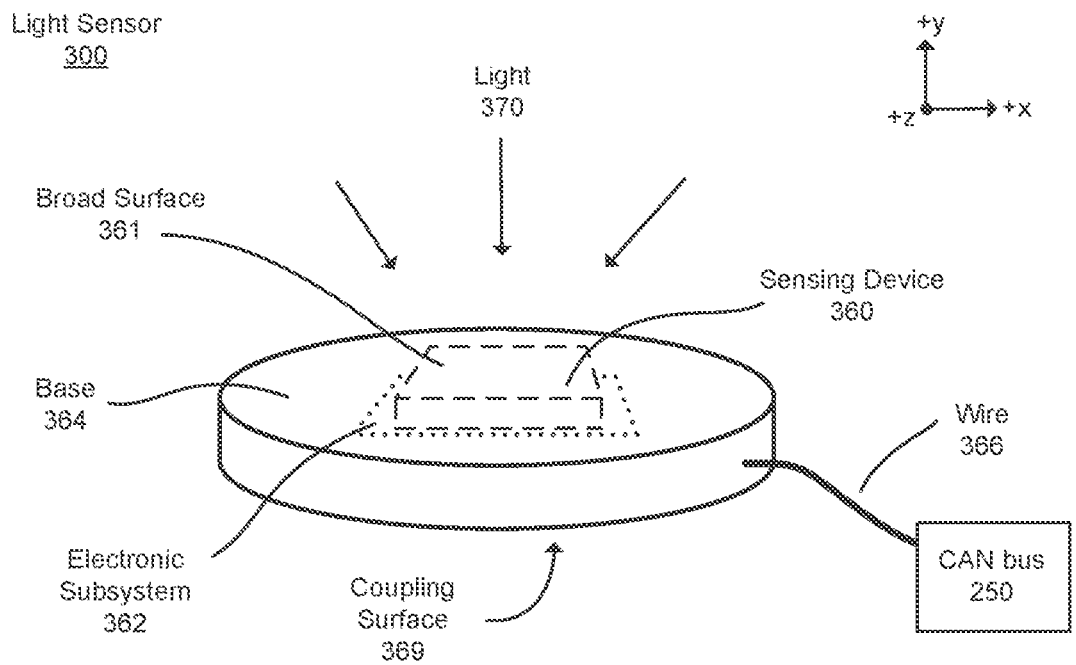
FIG. 3A illustrates a schematic of a light sensor for receiving and processing incident light without a cap, in accordance with one embodiment.
Figure 3B:
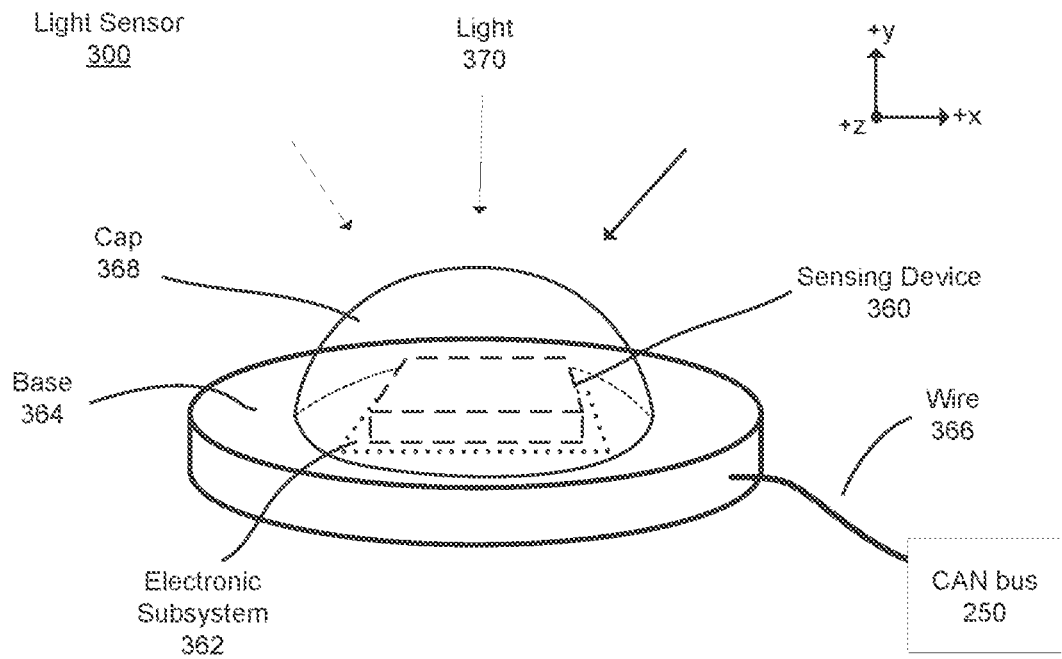
FIG. 3B illustrates a schematic of a light sensor for receiving and processing incident light with a cap, in accordance with one embodiment.

As mentioned above, the light measurement system 210 includes at least one light sensor to receive light. In some embodiments, the light measurement system 210 includes additional light detectors, light measurement optics, fibers, etc. for measuring and processing incident light. FIGS. 3A-3B illustrate a schematic of a light sensor 300, according to an embodiment. The light sensor 300 includes a sensing device 360, an electronic subsystem 362, a base 364, a wire 366, and a cap 368. In alternative embodiments, the light sensor 300 includes fewer or greater elements than described below.

The light sensor 300 includes a sensing device 360 for converting light incident upon the sensing device ("incident light 370" or simply "light 370") into signals representative of the light. The sensing device may include one or more pixels/detectors depending on the configuration. The sensing device 360 evaluates various spectrums of light. In an example, the sensing device evaluates visible, infrared, and/or ultraviolet light. The sensing device 360 measures light intensity and converts the measured light intensity to a digital output signal. The sensing device 360 can also include a color sensing feature to measure color temperature. In the embodiment of FIGS. 3A-3B, the sensing device is a rectangular prism with a broad surface 361 configured to receive light 370. The broad surface 361 is upward facing, described in greater detail below, to receive available light 370. The sensing device 360 is approximately 1.5-2.5 millimeters wide, 1.5-2.5 millimeters long, and 0.40-0.80 millimeters tall. In alternative embodiments, the sensing device 360 can have any suitable shape and dimensions for receiving incident light 370.

The sensing device 360 is coupled (e.g., electronically, mechanically) to the electronic subsystem 362. The electronic subsystem 362 allows for signal and power transmission between devices. In the embodiment of FIGS. 3A-3B, an inferior surface of the sensing device 360 (e.g., a surface opposing the broad surface 361) is coupled to the electronic subsystem 362. In some embodiments, the electronic subsystem 362 is a printed circuit board (PCB). In alternative embodiments, the electronic subsystem 362 can be any element suitable for supporting the function of the sensing device 360.

The electronic subsystem 362 is coupled to the CAN bus 250 via a wire 366. The wire 366 functions to transmit signals between components. In the embodiment of FIGS. 3A-3B, the wire 366 is an electrically conductive wire encased by an insulative material for protection from external components and operating conditions (e.g., rain). In other embodiments, the wire 366 is composed of a different material for signal transmission and/or the light sensor 300 includes additional wires for connecting the sensing device 360 and/or the electronic subsystem 362 to additional components (e.g., control system 130, image acquisition system 220, a power source, a computer, etc.). In one example, the sensing device 360 is coupled to an optic fiber for transmitting light signals to the control system 130 for processing. In alternative embodiments, the electronic subsystem 362 is in wireless communication with the CAN bus 250 or is connected to a different component via the wire 366.

The electronic subsystem 362 and the sensing device 360 are coupled to a cylindrical base 364 for support. In alternative embodiments, the base 364 can be a rectangular prism, a trapezoidal prism, a parallelepiped, or any other shape suitable for supporting the electronic subsystem 362 and the sensing device 360. The base 364 can include a receptacle for retaining the electronic subsystem 362 and the sensing device 360 in position. As such, the sensing device 360 and the electronic subsystem 362 can be recessed below a surface of the base 364 in the receptacle. In alternative embodiments, the electronic subsystem 362 and/or the sensing device 360 are protruding from the base 364. In the embodiment of FIGS. 3A-3B, the base 364 has a height of approximately 0.6 to 2 millimeters and a diameter of 2 to 4 millimeters. Alternatively, the base 364 can have any suitable dimensions for supporting the sensing device 360 and/or the electronic subsystem 362.

In FIGS. 3A-3B, the base 364 is composed of an insulative material (e.g., rubber, plastic, etc.) to prevent undesired signal transmission between the sensing device 360, the electronic subsystem 362, the farming machine 100, and other system components. The base 364 is also composed of a water resistant and elastic material for protecting electronic components from damage. Alternatively, the base 364 can be composed of any material suitable for supporting the other components of the light sensor 300. The base 364 is attached to a farming machine 100 by a coupling surface 369 (e.g., a bottom surface) such that the broad surface 361 of the sensing device 360 is upward facing. The coupling surface 369 can be permanently coupled to the farming machine 100 (e.g., welded, glued, etc.) or the coupling surface 369 can be temporarily attached such that the light sensor 300 can be removed for repair, replacement, etc. In other embodiments, the coupling surface 369 can be a different surface of the base 364.

As shown in FIG. 3B, a cap 368 may be coupled to the base 364 for shielding the electronic subsystem 362 and the sensing device 360 from the environment. In the embodiment of FIG. 3B, the cap 368 has a hemispheric shape and is composed of a translucent material (e.g., glass, plastic, etc.). The cap 368 is also composed of a material that is water resistant and elastic for protecting the sensing device 360 and the electronic subsystem 362 from the environment. The cap 368 may be removably coupled to the sensing device 360 such that elements of the light sensor 300 can be easily replaced or repaired. In other embodiments, the cap 368 can have any other shape and can be composed of any material suitable for protecting the sensing device 360 and the electronic subsystem 362, and/or may be permanently coupled to the base 364. In one example, the cap 368 is flush with a surface of the base 364 for shielding and/or retaining the sensing device 360 in position (e.g., within a receptacle of the base 364). Furthermore, in some embodiments, the cap 368 can encapsulate the sensing device 360, the electronic subsystem 362 and the base 364. Additionally, in some embodiments, the light sensor 300 may not include a cap 368.

Returning briefly to FIG. 2, the light measurement system 210 includes one or more light sensors 300 described in FIGS. 3A and 3B. In some embodiments, the light measurement system 210 includes an array of light sensors. Similarly, the image acquisition system 220 includes one or more image sensors. In general, an image sensor detects and conveys information used to make an image. An image sensor can be a digital camera, a camera module, a thermal imaging device, a radar, etc. In some embodiments, the image acquisition system 220 includes an array of cameras. The cameras can have various capabilities and may be configured to capture various light spectra. Examples include, but are not limited to, RGB cameras, near infrared (e.g., red edge or short wave infrared) cameras, ultraviolet cameras, and multi-spectral cameras. The cameras generally use CMOS digital image sensors, but may also be CCD image sensors. The image acquisition system 220 can also include alternate receptors, focusing optics, data connections, etc. for capturing an image suitable for identifying a plant.

V. System Embodiments

A light sensor 300 included in a light measurement system 210 and an image sensor included in an image acquisition system 220 can be configured to a variety of systems. In one embodiment, components of the light measurement system 210 and components of the image acquisition system 220 are coupled to a farming machine (e.g., farming machine 100) to identify plants as the farming machine moves through a field. FIGS. 4A-4D illustrate various configurations of a farming machine (e.g., 400a, 400b, 400c, 400d) including a light measurement system 210 with at least one light sensor (e.g., 410a, 410b, 410c, and 410d) and an image acquisition system 220 with at least one image sensor (e.g., 420a, 420b, 420c, and 420d), in accordance with several embodiments.

In the embodiments of FIGS. 4A-4D, the farming machines are substantially similar to each other and to farming machine 100, however, each farming machine illustrates a different configuration of light sensors and image sensors, described in greater detail below. Each farming machine (e.g., 400a, 400b, 400c, 400d) includes a mounting mechanism 140 illustrated as two segments extending laterally from the body of the farming machine. The farming machine moves in a positive z-direction (e.g., towards the reader) such that the mounting mechanism is approximately perpendicular to the direction of travel. The farming machine (e.g., 400a, 400b, etc.) includes a control system 130 for controlling the image acquisition system 220 and the light measurement system 210.

In the illustrated examples, the light sensor(s) are positioned to measure incident light and the image sensor(s) are positioned to capture images of plants in the field. The farming machine changes the settings of the image sensor(s) based on incident light measured by the light sensors to increase the quality of images captured by the image sensor(s). Higher quality images allow the farming machine to more accurately identify and treat plants in the field.

In the illustrated examples, a light sensor 410 is illustrated as a box with a solid white fill. Each light sensor is coupled to a surface of the farming machine such that the light sensor is directed in an upwards orientation away from the plants in the field. Here, upwards is represented by a value of a relative angle between a vector normal to a surface (e.g., broad surface 361) of a sensing device (e.g., sensing device 360) in the light sensor (e.g., light sensor 300) and the positive y-axis (e.g., upwards in the plane of the page for the illustrated examples). In an example, upwards may be any value of the relative angle less than 90°. In other examples, upwards may be a value of the relative angle less than a threshold angle (e.g., 30°, 40°, 50°, 60°, etc.). Whatever the orientation, the light sensor is positioned to measure incident light that, when processed by the farming machine, indicates one or more settings of the image sensor to change in order to capture higher quality images of plants in the field. In some embodiments, the control system 130 adjusts the angle of a light sensor 410 based on operating conditions. For example, the control system 130 sets the angle to 80° in the morning (i.e., when the sun is low in the sky) and to an angle of 10° during mid-day (i.e., when the sun is high in the sky).

In the illustrated examples, an image sensor 420 is illustrated as a box with a cross-hatch pattern. Each image sensor is coupled to a surface of the farming machine such that the image sensor is directed in a downwards orientation towards the plants in the field. Downwards is represented by a value of a relative angle between a vector normal to a lens of an image sensor and the negative y-axis. In one example, downwards may be any value of the relative angle less than 90°. In other examples, downwards may be a value of the relative angle less than a threshold angle (e.g., 30°, 40°, 50°, 60°, etc.). The image sensor is oriented such that it captures an image of one or more plants in the field as the farming machine travels through a field. In some embodiments, the control system 130 adjusts the angle of an image sensor 420 based on an operating condition. For example, the control system 130 sets the angle to 10° in bright conditions and an angle of 25° in cloudy conditions. The farming machine may identify plants in the image, and treat the identified plants accordingly.

Figure 4A:
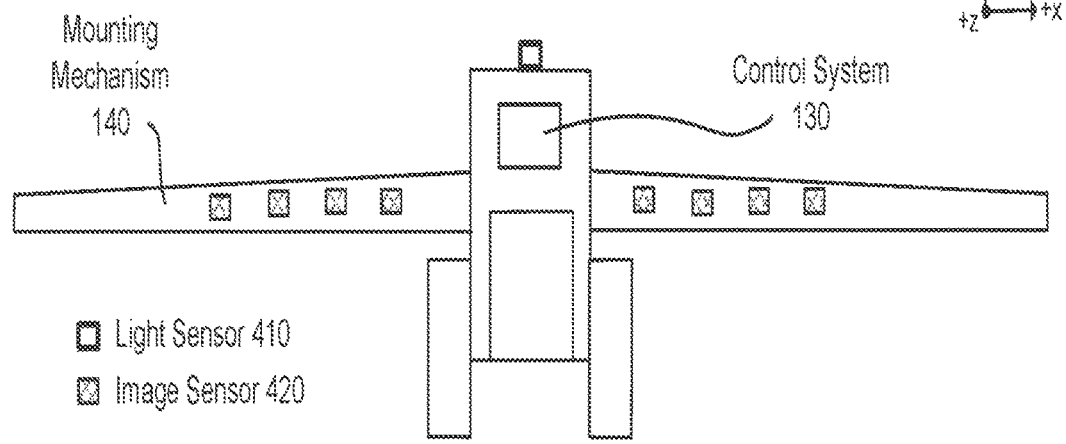
FIG. 4A illustrates a first configuration of a farming machine including a light sensor and an image sensor, in accordance with one embodiment.

FIG. 4A illustrates a first embodiment of a farming machine including an upward facing light sensor and downward facing image sensors. The farming machine 400a includes eight image sensors 420 and one light sensor 410. The image sensors 420 are positioned such that four image sensors are located laterally along a front surface of the mounting mechanism 140. The location of the image sensors 420 on the mounting mechanism 140 is approximately symmetric along a midline of the farming machine 400a. The light sensor 410 is coupled to a superior surface (e.g., top) of the farming machine 100 and is approximately aligned with the midline of the farming machine 400. In the embodiment of FIG. 4A, the control system 130 adjusts the settings of the array of image sensors 420a based on the light measured by the light sensor 410. As such, the image sensors 420 operate in a collective manner. Here, operating in a collective manner indicates that the control system 130 makes the same setting adjustment for each image sensor 420 coupled to the farming machine 400 based on the light measurement determined by the light sensor 410.

Figure 4B:
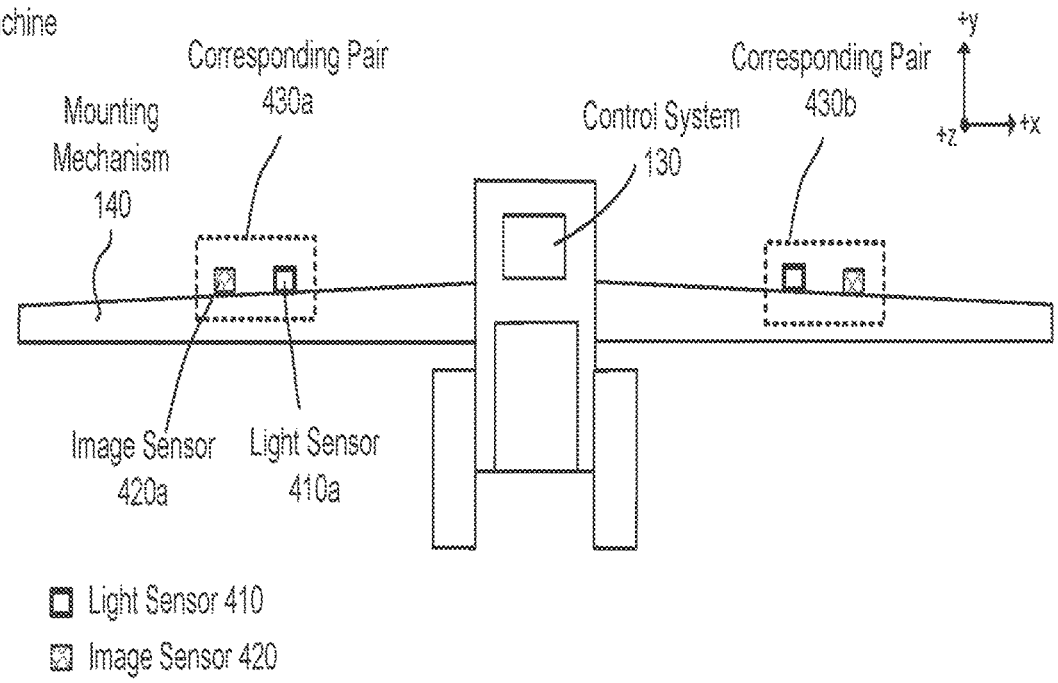
FIG. 4B illustrates a second configuration of a farming machine including a light sensor and an image sensor, in accordance with one embodiment.

FIG. 4B illustrates a second embodiment of the farming machine including upward facing light sensors and downward facing image sensors. The farming machine 400b includes two light sensors 410 and two image sensors 420. A light sensor 410 is coupled to a superior surface of the mounting mechanism 140 at a mid-region of the mounting mechanism 140. An image sensor 420 is coupled to a superior surface of the mounting mechanism 140 adjacent to a light sensor 410 of the mounting mechanism 140. In the embodiment of FIG. 4B, each light sensor 410 corresponds to an image sensor 420 (a "corresponding pair"). FIG. 4B illustrates two corresponding pairs (e.g., 430a, 430b) of light sensors 410 and image sensors 420. As a particular example, the corresponding pair 430a includes a particular image sensor 420a and a particular light sensor 410a. Settings of an image sensor 420 are adjusted based on the light measured by the light sensor 410 in its corresponding pair 430. For example, the control system 130 adjusts the settings of the image sensor 420a in the corresponding pair 430a based on incident light measured by the light sensor 410a in the corresponding pair 430a.

FIG. 4C illustrates a third embodiment of the farming machine including upward facing light sensors and downward facing image sensors. The farming machine 400c includes three light sensors and two image sensors. A first and second light sensor are coupled to each free end of the mounting mechanism 140, respectively. A third light sensor is coupled to a superior surface of the farming machine 400c at approximately a midline of the farming machine 400c. The image sensors 420 are located laterally along an inferior surface of the mounting mechanism 140. In the illustrated example, there is a single light sensor 410 and a single image sensor 420 on each segment of the mounting mechanism 140. In an embodiment, the light sensor 410 and image sensor 420 on each segment of the mounting mechanism 140 may form a corresponding pair similar to above. However, in an embodiment, the light sensors 410 and image sensors 420 of the farming machine 400c act in conjunction. That is, the farming machine 400c uses measured characteristics from all of the light sensors 410 to control the image sensors 420. For example, a control system 130 evaluates a characteristic of light (e.g., intensity) measured by each of the three light sensors 410 and determines an average of the characteristic of light based on the three light sensors 410. The control system 130 adjusts one or more settings of the image sensors 420 based on the average. In alternative embodiments, the control system 130 selects one or more of the light sensors 410 to determine a characteristic of light, described in greater detail below in relation to FIG. 5C.

FIG. 4D illustrates a fourth embodiment of the farming machine including an upward facing light sensor and downward facing image sensors. The farming machine 400d includes one light sensor 410 and nine image sensors 420. Eight image sensors 420 are attached laterally along the mounting mechanism 140. An image sensor 420 and the light sensor 410 are coupled to a rod 415 extending from the farming machine 400d. The rod 415 extends approximately orthogonal to the mounting mechanism 140 to separate the light sensor 410 from other components and/or the environment (e.g. to keep the light sensor 410d away from dirt, from interfering with a treatment mechanism, etc.). The rod 415 is approximately aligned with a midline of the farming machine 400d. In one example, the rod 415 is a metal rod such that the rod is substantially straight during different operational conditions. In other examples, the rod 415 may be flexible such that the light sensor 410d can be angled with respect to the sun (e.g., a broad surface 361 of the light sensor is angled with respect to an azimuth angle of the sun, or by an angle selected by an operator of the farming machine). In other embodiments, the rod can be placed in any other location along the farming machine 400d (e.g., extending from the mounting mechanism 140, at the rear of the farming machine 400d, etc.). Additionally, one or more of the image sensors 420 may also be attached to one or more additional rods such that they extend away from the mounting mechanism 140.

FIGS. 4A-4D illustrate a variety of configurations of light sensors 410 and image sensors 420. In alternative embodiments, other configurations of light sensors and image sensors may be used for plant identification. For example, the configuration of light sensors shown in FIG. 4C may be combined with the configuration of image sensors shown in FIG. 4D. Furthermore, in some embodiments, light sensors and/or image sensors may be coupled to a different machine. For example, a light sensor may be attached to a drone or located in a stationary position (e.g., on a post, on a greenhouse, on a shed) and connected wirelessly to the control system 130. In other embodiments, an image sensor and a light sensor can be coupled to any surface (e.g., front, back, side, top) and any component of a farming machine provided each sensor is facing the appropriate direction (e.g., a light sensor is facing away from the plants and an image sensor is facing towards the plants). Configurations of light sensors and image sensors may be optimized for effectively identifying and treating plants in different modes of operation.

VI. Operating Conditions

Figure 5A:
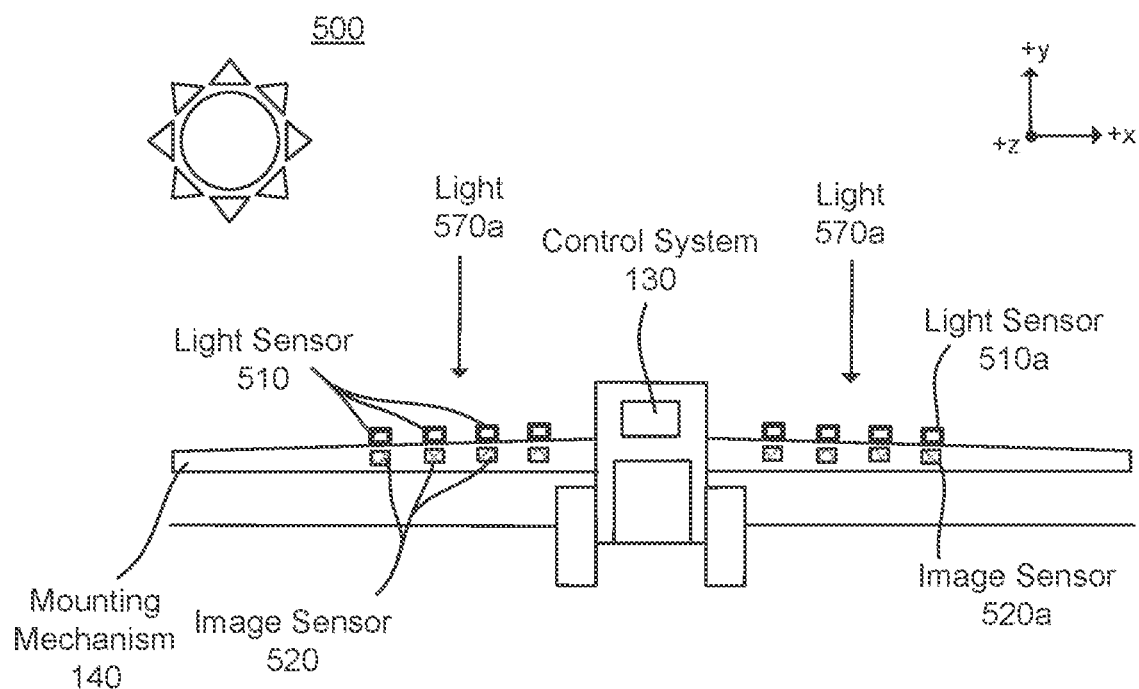
FIG. 5A is a schematic of a first operational condition of a farming machine with an array of light sensors, in accordance with one embodiment.
Figure 5B:
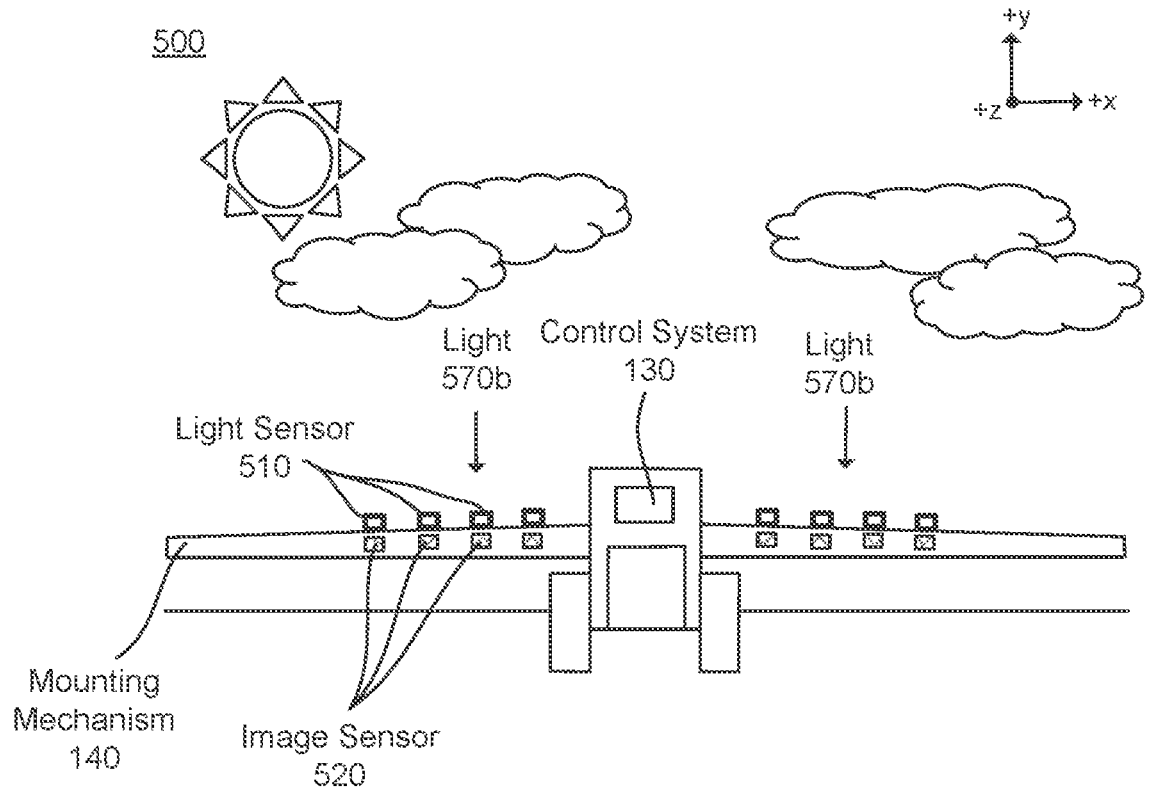
FIG. 5B is a schematic of a second operational condition of a farming machine with an array of light sensors, in accordance with one embodiment.
Figure 5C:
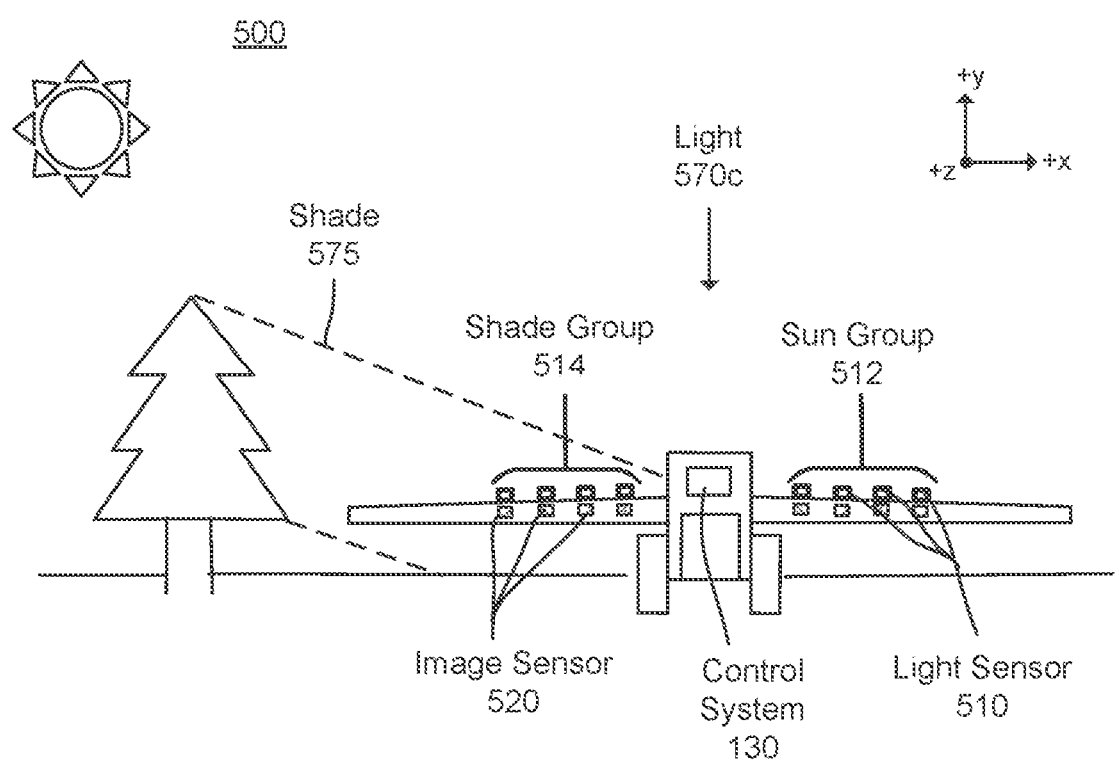
FIG. 5C is a schematic of a third operational condition of a farming machine with an array of light sensors, in accordance with one embodiment.

FIGS. 5A-5C illustrate various operating conditions that a farming machine may experience, in accordance with an embodiment. The illustrated farming machine 500 is substantially similar to the farming machine 100. The farming machine 500 includes an array of upward facing light sensors 510 and an array of downward facing image sensors 520 coupled to the mounting mechanism 140. In alternative embodiments, the farming machine 500 can include a different number and/or configuration of light sensors 510 and/or image sensors 520. The light sensors 510 are configured to measure a characteristic of light incident on the sensors. As described above, the control system 130 adjusts one or more settings of an image sensor 520 based on characteristics determined by a light sensor in order to increase image quality and accurately identify and treat plants. The control system may adjust the settings based on different operational conditions (e.g., light conditions). Some examples of different operational conditions are described below.

FIG. 5A illustrates a farming machine 500 operating on a sunny day. On a sunny day, the brightness of a captured image may be high, which may affect image processing and plant identification. As such, the control system 130 adjusts settings of the image sensors 520 to enhance plant identification accuracy. For example, the light sensors 510 measure a light intensity of the light 570a. The measured light intensity is associated with images having incorrect white balance which, in turn, causes the control system 130 to misidentify plants. As such, the control system 130 may increase the shutter speed of the image sensors 520 to compensate for images captured in overly bright operational conditions. In some cases, light 570a measured by light sensors 510 on a sunny day may not cause the control system 130 to modify settings of the image sensors 520.

FIG. 5B illustrates the farming machine 500 operating on a cloudy day. On a cloudy day, an image captured by an image sensor 520 may seem dark, thereby causing the control system 130 to misidentify plants. To illustrate, the image sensors 520 are configured for operation on a sunny day and, thereby, images captured by the image sensors 520 are too dark. This discrepancy is because the light 570a on a sunny day is different than the light 570b on a cloudy day. As such, the light 570b on a cloudy day may have different measured characteristics (e.g., a lower intensity, cooler color temperature) than the light 570a on a sunny day. The control system 130 adjusts the settings of the image sensors 520 according to the measured characteristic of light 570b. For example, the control system 130 decreases the shutter speed of the image sensors 520 such that the captured images appear less dark.

In the embodiments of FIGS. 5A-5B, each of the light sensors 510 in the array of sensors receive the same light (e.g., 570a, 570b). As such, the control system 130 determines an average value of the characteristic of light (e.g., 570a, 570b) using the array of light sensors 510. The control system 130 collectively adjusts settings of the image sensors 520 based on the average value. In alternative embodiments, the light measured by each light sensor 510 may be used to adjust the settings of a corresponding image sensor 520 (e.g., image sensor 520a and light sensor 510a are a corresponding pair).

However, in some cases, light sensors do not receive the same light. In these examples, the control system 130 compares characteristics of light measured by each sensor in the array of light sensors 510 to eliminate outliers and/or improve plant identification and treatment accuracy in case of uneven light conditions. Uneven lighting conditions may occur when one or more light sensors malfunction, are low on battery, are covered in dust, pass through the shade, etc. In one example, the control system 130 eliminates readings outside of a threshold range based on a median or average value. In other examples, the control system 130 determines a standard distribution of the values of a characteristic of light measured by each light sensor 510 in an array. The control system 130 can eliminate one or more light sensors 510 based on the standard distribution. Responsive to identifying one or more measurements to be eliminated, the control system 130 may ignore the measurement, remove the light sensor that recorded the measurement from subsequent operation, alert the system (e.g., send a message to an operator, automatically generate an error warning, etc.), or take any other appropriate remedial action. In a similar manner, light sensors may include one or more pixels/detectors as described above. In this case, each individual light sensor may be able to assist in determining uneven lighting conditions, etc. For example, if a shadow lies across the sensor and half of the detectors are receiving full light, while half are receiving partial light.

FIG. 5C illustrates the farming machine operating in uneven lighting conditions. In this particular example, the farming machine 500 is operating on a sunny day, and one or more of the light sensors 510 is passing through shade. In the example, the light sensors 510 measure a characteristic of light 570c in the sun (e.g., sun group 512) different than the same characteristic of light measured by the light sensors 510 in the shade 575 (e.g., shade group 514). For example, the sun group 512 measures an intensity approximately 110,000 lux and the shade group 514 measures an intensity of approximately 20,000 lux. Averaging the measurements of a characteristic of light from the array of light sensors 510 can lead to capturing images that are unsuitable for accurate identification, and subsequent treatment, of a plant.

The farming machine may employ a variety of methods to avoid inaccurate identification of plants caused by uneven lighting conditions. In an example, the control system 130 compares a characteristic measured by each of the light sensors 510 to determine a difference in the received light between each of the light sensors in the array of light sensors. In some embodiments, responsive to determining the difference is above a measurement threshold, the control system 130 selects a subset of the array of light sensors 510 and measures a characteristic of light based on the subset of the array of light sensors. The control system 130 can select a subset of the array of light sensors 510 based on a time of day of operation, by comparing measurements to one or more recent measurements recorded by the light sensors 510, comparing measurements to a standard value, or according to any other suitable guidelines. Continuing with the previous example, if the measurement threshold is 20,000 lux, the difference exceeds the measurement threshold. Responsive to the difference exceeding the measurement threshold, the control system 130 selects the sun group 512 to determine the characteristic of light (e.g., the control system 130 determines an intensity of 110,000 lux). Additionally, the control system 130 adjusts image acquisition settings based on the average of the measured characteristic of the subset of the array of light sensors. In alternative embodiments, another suitable method of evaluating a characteristic of light may be used.

Figure 6:
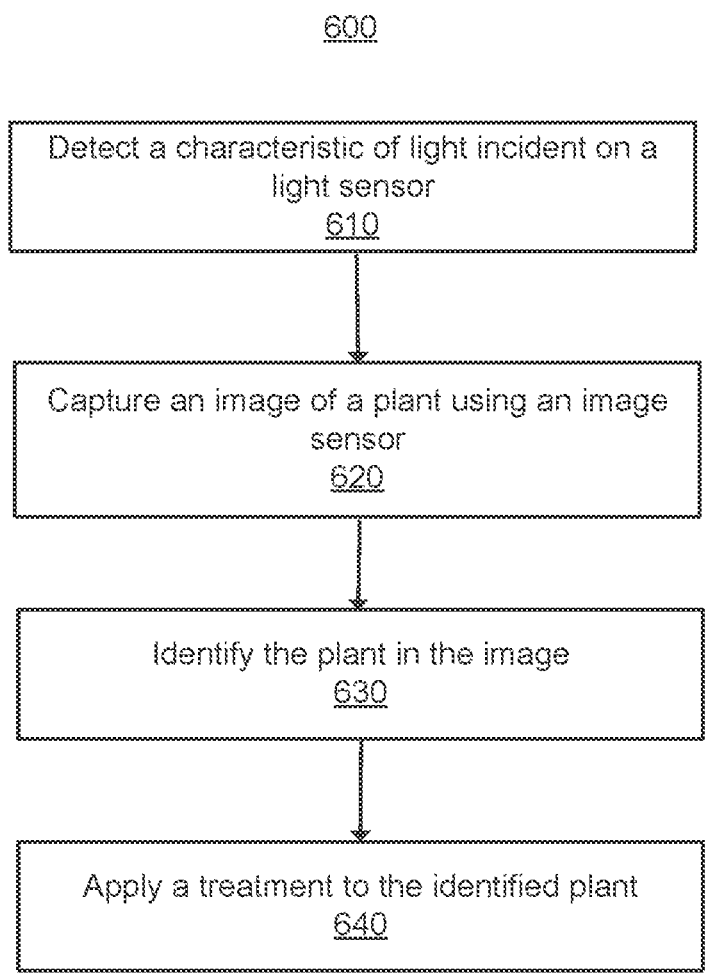
FIG. 6 is a flow chart illustrating a method of identifying and treating a plant using a farming machine with an upward facing light sensor and a downward facing image sensor, in accordance with one embodiment.

VI. Example Identification and Treatment During Different Operating Conditions FIG. 6 is a flow chart illustrating a method of identifying and treating a plant using a farming machine with an upward facing light sensor and a downward facing image sensor, according to one or more embodiments. The steps of FIG. 6 are illustrated from the perspective of a system (e.g., control system 130) with a hardware processor performing the method 600. However, some or all of the steps may be performed by other systems or components. In addition, in some embodiments, the steps may be performed in parallel, in different orders, or asynchronously, and in other embodiments, different steps altogether may be performed.

A farming machine including an imaging system for identifying plants and a treatment mechanism for treating identified plants. Traditionally, the farming machine has limited hours of operation. For example, as the sun sets in the afternoon, the intensity of available light decreases and the color temperature darkens. Images captured by an imaging system will appear darker compared to images captured by the imaging system at an earlier time of day. Due to the darker images, the farming machine cannot accurately identify the plants. However, here, the farming machine includes an imaging system with an upward facing light sensor and downward facing image sensor. The farming machine is configured to determine the characteristics of light in the environment in real time and adjust the settings of the imaging system accordingly. The real time adjustment of the imaging system allows the farming machine to capture images and identify plants at times that were, traditionally, untenable for the farming machine.

For example, a farming machine may employ method 600 to properly identify and treat plants at sunset. The farming machine is moving through a field to identify plants (e.g., a crop) and treat the identified plants by spraying them with a growth promoter. To identify plants, a light sensor (e.g., light sensor 300) of the farming machine detects 610 a characteristic of light incident on the light sensor. The light sensor is mounted in a substantially upward orientation away from the field as described above in relation to FIGS. 4A-4D. As an example, the farming machine captures an intensity of light and/or color temperature of the light on the light sensor.

A control system (e.g., control system 130) of the farming machine adjusts a setting of an image sensor (e.g., image capture module 224) of the imaging system. The image sensor is mounted in a substantially downwards orientation towards the plants. The imaging system captures 620 an image of a plant in the field using the setting(s) for the image sensor determined based on the measured light characteristic. For example, the control system 130 may adjust a shutter speed of the image sensor based on the measured intensity of light and/or color temperature.

The control system identifies 630 the plant in the image. In an example, the control system employs a plant identification model to identify the plant in the image. The plant identification model identifies latent information in the image indicating that one or more of the pixels represent a plant. For example, a plant identification model identifies pixels in the image representing a soybean plant that is suitable for treatment with a growth promoter. Adjusting exposure parameters of the image sensors allows the plant to be properly identified and treated in different lighting conditions (e.g., sunset). For example, without the capabilities described herein, the plant identification model may not be able to identify the soybean plant because the image, and the plant in the image, are too dark to be discernable. In some embodiments, instead of adjusting a setting of an image sensor, the control system captures an image of a plant using default or pre-set settings, and performs one or more image processing operations on the image based on the measured light characteristic in order to identify the plant within the image. In yet other embodiments, the identification of the plant within the image is performed based on the measured light characteristic.

The control system generates control instructions for the treatment mechanisms such that the treatment mechanism apply 640 a treatment to the identified plant as the farming machine travels past the plant in the field. For example, the control system generates machine instructions for a spray mechanisms that sprays growth promoter on the identified soybean plant as the farming machine travels past the plant in the field.

IX. Control System

Figure 7:
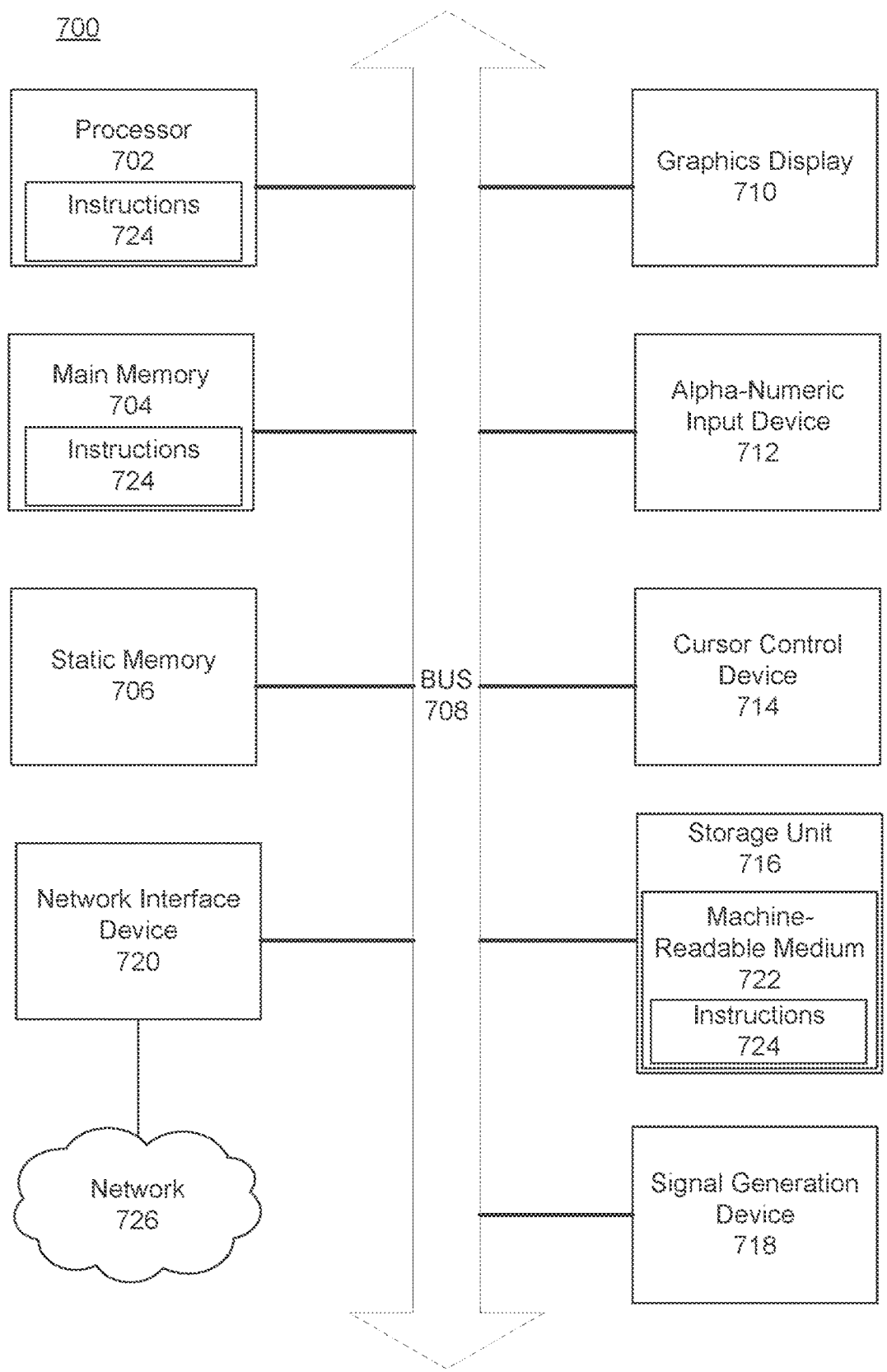
FIG. 7 is a schematic illustrating a control system, in accordance with one embodiment.

FIG. 7 is a block diagram illustrating components of an example machine for reading and executing instructions from a machine-readable medium. Specifically, FIG. 7 shows a diagrammatic representation of control system 130 in the example form of a computer system 700. The computer system 700 can be used to execute instructions 724 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 700 also includes a main memory 704. The computer system may include a storage unit 716. The processor 702, memory 704, and the storage unit 716 communicate via a bus 708.

In addition, the computer system 700 can include a static memory 706, a graphics display 710 (e.g., to drive a plasma display panel (PDP), a liquid crystal display (LCD), or a projector). The computer system 700 may also include alphanumeric input device 712 (e.g., a keyboard), a cursor control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. For example, the instructions 724 may include the functionalities of modules of the system 130 described in FIG. 2. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726 via the network interface device 720.

The control system 130 can comprise a processing unit (e.g., one or more of a CPU, a GPU, or an FPGA) and a data storage medium (e.g., static or dynamic memory). In one embodiment, the control system 130 comprises a deep-learning GPU that is configured to effectively execute a deep-learning neural network. For example, the computer system 700 may include an NVIDIA GeForce® GTX™ TITAN X using the Caffe deep learning framework or the NVIDIA Tx1 or Tx2 using the Tensorflow deep learning framework. Furthermore, image data passed in to the computer instructions may be transmitted to the control system 130 for processing using any type of transmission protocol. For example, the open systems interconnect (OSI) model may be used to send image data from the image acquisition system 220 to the control system 130 using ethernet connections between these components.

X. Additional Considerations

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms or models and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some of the operations described herein are performed by a computer physically mounted within a farming machine 100. This computer may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory computer readable storage medium suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for identifying and treating plants with a farming machine including a control system executing a semantic segmentation model. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

The invention claimed is:

1. A plant identification system comprising:
    an image acquisition system configured to capture an image of a plant in a field, the image acquisition system removably couplable from a farming machine and configured for capturing an image of the plant using an image sensor directed in a downwards orientation towards the plant;
    a light measurement system removably couplable from the farming machine configured to measure light incident on the light measurement system, the light measurement system measuring the incident light using a light sensor directed in an upwards orientation away from the plant;
    a control system including a processor, the processor configured to:
        measure, using the light measurement system, a characteristic of light incident upon the light sensor,
        capture the image of the plant in the field using the image acquisition system configured to operate based on the measured characteristic of incident light, wherein capturing the image of the plant comprises adjusting a configuration of the image acquisition system by modifying one or more exposure parameters of the image acquisition system based on a difference between an actual reflectance and a perceived reflectance of the plant,
        identify the plant in the image based on (1) pixels in the image identified as representing the plant and (2) image properties of the captured image corresponding to the measured characteristic of light and configuration of the image acquisition system, and
        generate a control signal that, when received by a plant treatment mechanism of the farming machine, actuates the plant treatment mechanism to treat the identified plant.

2. The plant identification system of claim 1, wherein the image acquisition system further comprises:
    one or more additional image sensors, each of the one or more additional image sensors directed in the downwards orientation.

3. The plant identification system of claim 1, wherein the light measurement system comprises one or more light sensors.

4. The plant identification system of claim 1, wherein:
    the light sensor is coupled to a top surface of the farming machine, and
    the image sensor is coupled to a bottom surface of the farming machine.

5. The plant identification system of claim 1, wherein the plant treatment mechanism is mounted to the farming machine with a mounting mechanism, the mounting mechanism having a first length that is substantially orthogonal to a direction of movement of the farming machine, and wherein the plant treatment mechanism is coupled to the mounting mechanism.

6. The plant identification system of claim 5, wherein:
    the image acquisition system is mounted to the mounting mechanism, and
    the light measurement system is mounted to the mounting mechanism.

7. The plant identification system of claim 1, wherein the light measurement system comprises:
    an electronic subsystem coupled to the light sensor;
    a base including a receptacle configured to retain the electronic subsystem and the light sensor, the receptacle recessed within at least one of a set of surfaces of the base; and
    a cap coupled to the base wherein the cap encloses the electronic subsystem and the light sensor.

8. The plant identification system of claim 7, wherein the image sensor is one of:
    coupled to a front surface of the farming machine and directed downwards,
    coupled to a bottom surface of the farming machine and directed downwards,
    coupled to the bottom surface of the farming machine and titled forward,
    coupled to a top surface of the farming machine and direct downwards, and
    coupled to a side of the farming machine and directed downwards.

9. A farming machine comprising:
    a removably couplable light measurement system coupled to the farming machine, the light measurement system configured to measure a characteristic of light;
    a removably couplable image acquisition system coupled to the farming machine, the image acquisition system configured to capture an image of a plant in a field;

a plurality of plant treatment mechanisms for treating plants in the field; and a control system for:

capturing an image of the plant in the field using the image acquisition system, wherein capturing the image comprises adjusting a configuration of the image acquisition system by modifying one or more exposure parameters of the image acquisition system based on a difference between an actual reflectance and a perceived reflectance of the plant;

identifying the plant in the image and actuating one or more of the plurality of plant treatment mechanisms to treat the identified plant based on pixels in the image identified as representing the plant.

10. The farming machine of claim 9, wherein the image acquisition system comprises one or more image sensors, each of the image sensors facing in a downwards direction towards the plant as the farming machine moves through the field.

11. The farming machine of claim 9, wherein the light measurement system comprises one or more light sensors.

12. A method comprising:

detecting an amount of light incident on a light sensor mounted on a farming machine passing through a field;

capturing an image of a plant in the field using an image acquisition system mounted on the farming machine, the image captured using one or more exposure parameters for the image sensor selected based, by:

adjusting the one or more exposure parameters of the image acquisition system based on a difference between an actual reflectance and a perceived reflectance of the plant;

identifying the plant in the image based on pixels in the image identified as representing the plant; and applying, with a treatment mechanism mounted on the farming machine, a treatment to the identified plant.

13. The method of claim 12, wherein the image sensor is orientated to face downward towards the plant in the field.

14. The method of claim 12, wherein adjusting the one or more exposure parameters includes:

determining the difference exceeds a difference threshold; and responsive to the difference exceeding the difference threshold, adjusting an exposure parameter of the one or more exposure parameters.

15. The method of claim 12, wherein the one or more exposure parameters is one of: shutter speed, aperture, ISO speed, or white balance.

16. The method of claim 12, further comprising:

evaluating a characteristic of the detected light;

determining whether the characteristic of the detected light exceeds a threshold corresponding to the characteristic; and responsive to determining the characteristic exceeds the threshold corresponding to the characteristic, adjusting the one or more exposure parameters.

17. The method of claim 16, wherein the characteristic is one of: light intensity or color temperature.

18. The method of claim 12, further comprising:

determining a characteristic of light incident on a plurality of light sensors mounted on the farming machine; and comparing the characteristic of light incident on each of the plurality of light sensors to determine a difference in the characteristic of light incident on each of the plurality of sensors.

19. The method of claim 18, further comprising:

selecting a subset of the plurality of light sensors based on the characteristic of light incident on each of the plurality of light sensors and the difference in the characteristic of light incident on each of the plurality of sensors; and evaluating the characteristic of light based on the subset of the plurality of light sensors.

20. The method of claim 19, further comprising adjusting the one or more exposure parameters based on the characteristic of light evaluated by the subset of the plurality of light sensors.

* * * * *